United States Patent
Imamura et al.

(10) Patent No.: US 8,342,274 B2
(45) Date of Patent: Jan. 1, 2013

(54) CONTROL DEVICE FOR POWER TRANSMISSION DEVICE FOR VEHICLE

(75) Inventors: Tatsuya Imamura, Okazaki (JP); Tooru Matsubara, Toyota (JP); Atsushi Tabata, Okazaki (JP); Yuji Iwase, Mishima (JP); Kenta Kumazaki, Toyota (JP); Keita Imai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 151 days.

(21) Appl. No.: 13/056,045

(22) PCT Filed: Aug. 28, 2009

(86) PCT No.: PCT/IB2009/006663
§ 371 (c)(1),
(2), (4) Date: Jan. 26, 2011

(87) PCT Pub. No.: WO2010/023542
PCT Pub. Date: Mar. 4, 2010

(65) Prior Publication Data
US 2011/0127095 A1    Jun. 2, 2011

(30) Foreign Application Priority Data
Aug. 29, 2008    (JP) .................................. 2008-222741

(51) Int. Cl.
B60W 10/04    (2006.01)
(52) U.S. Cl. ............................. 180/65.285; 180/65.235
(58) Field of Classification Search ............ 180/65.285, 180/65.235, 65.23, 65.21, 65.265, 65.275, 180/65.8; 475/3, 15, 117
See application file for complete search history.

(56) References Cited

U.S. PATENT DOCUMENTS

| 4,211,930 A * | 7/1980 | Fengler ........................ 180/65.8 |
| 5,275,069 A * | 1/1994 | Baba et al. ..................... 475/117 |
| 5,732,681 A   | 3/1998 | Ogita |
| 6,914,410 B2 * | 7/2005 | Morgante et al. ............. 318/801 |

(Continued)

FOREIGN PATENT DOCUMENTS

JP    A-3-219163    9/1991

(Continued)

OTHER PUBLICATIONS

International Search Report for International Patent Application No. PCT/IB2009/006663, mailed on Dec. 1, 2009.

(Continued)

*Primary Examiner* — Hau Phan
(74) *Attorney, Agent, or Firm* — Oliff & Berridge, PLC

(57) ABSTRACT

When an engine is driven on a different type of fuel (for example, ethanol-containing fuel) from a reference fuel (for example, gasoline) and the engine torque is thus greater than that produced when the engine is driven on the reference fuel, a differential state control device expands a non-differential range compared to that at the time when the reference fuel is used. Thus, in the case where a plurality of types of fuel including the reference fuel are supplied to the engine, the advantage of switching a power distribution mechanism between a differential enabled state and a non-differential state can be fully utilized in correspondence with engine torque characteristics which may vary in accordance with the type of fuel for the engine. As a result, the fuel consumption rate can be reduced in correspondence with the plurality of types of fuel supplied to the engine, for example.

10 Claims, 9 Drawing Sheets

U.S. PATENT DOCUMENTS

| | | | |
|---|---|---|---|
| 7,555,374 B2 * | 6/2009 | Wu et al. | 180/65.8 |
| 7,568,994 B2 * | 8/2009 | Heap | 477/3 |
| 7,854,680 B2 * | 12/2010 | Sugai et al. | 477/15 |

FOREIGN PATENT DOCUMENTS

| | | |
|---|---|---|
| JP | A-4-316759 | 11/1992 |
| JP | A-5-79556 | 3/1993 |
| JP | A-2004-251178 | 9/2004 |
| JP | A-2005-240917 | 9/2005 |
| JP | A-2005-273900 | 10/2005 |
| WO | WO 2008/059337 A2 | 5/2008 |
| WO | WO 2008/133334 A1 | 11/2008 |

OTHER PUBLICATIONS

Written Opinion for International Patent Application No. PCT/IB2009/006663, mailed on Dec. 1, 2009.

Notification of Reason(s) for Refusal for priority Japanese Patent Application No. 2008-222741, dated Apr. 15, 2010, (w/ English translation).

* cited by examiner

| | C0 | C1 | C2 | B0 | B1 | B2 | B3 | TRANS-MISSION RATIO | STEP |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | | | ○ | | | | ○ | 3.209 | |
| N | | | | | | | | | |

○ : ENGAGED  ◎ : ENGAGED DURING SPEED SHIFT OPERATION, DISENGAGED DURING CONTINUOUSLY VARIABLE OPERATION

CONTROL DEVICE FOR POWER TRANSMISSION DEVICE FOR VEHICLE

INCORPORATION BY REFERENCE

The disclosure of Japanese Patent Application No. 2008-222741 filed on Aug. 29, 2008, including the specification, drawings and abstract is incorporated herein by references in its entirety.

BACKGROUND OF THE INVENTION

1. Field of the Invention

The present invention pertains to a control device for a power transmission device for a vehicle, and relates to a technique for using a plurality of types of fuel to drive an internal combustion engine.

2. Description of the Related Art

Conventionally, there has been known a power transmission device for a vehicle including a differential part that has a differential mechanism coupled between an internal combustion engine and driving wheels and a first motor coupled to the differential mechanism and that controls the differential state of the differential mechanism by controlling the operating state of the first motor, a speed shift transmission coupled between the differential part and the driving wheels, a second motor coupled to the input side of the speed shift transmission, and a differential restriction device capable of selectively switching the differential mechanism between a non-differential state in which its differential action is disabled and a differential enabled state in which its differential action is enabled. Such a power transmission device for a vehicle may be suitably used in hybrid vehicles, and is disclosed in Japanese Patent Application Publication No. 2005-273900 (JP-A-2005-273900), for example. A control device for the power transmission device for a vehicle according to JP-A-2005-273900 switches the differential mechanism between the non-differential state and the differential enabled state using the differential restriction device on the basis of predetermined conditions using the vehicle speed etc. as parameters.

In recent years, a plurality of types of fuel are occasionally used to drive an internal combustion engine. When different types of fuel are used to drive the internal combustion engine, the output characteristics of the internal combustion engine are also different. For example, in the case where the internal combustion engine is driven on an ethanol-containing fuel obtained by mixing ethanol into a gasoline fuel, the anti-knocking performance of the internal combustion engine is improved and the ignition timing of the engine is thus advanced, which tends to increase the output torque of the engine, compared to the case where the internal combustion engine is driven on the gasoline fuel. Thus, in order to maintain the operating efficiency of the entire vehicle at a high level, it is necessary that the predetermined conditions for switching the differential mechanism between the non-differential state and the differential enabled state should be modified in accordance with changes in output characteristics of the internal combustion engine due to changes in type of fuel. However, the control device according to JP-A-2005-273900 particularly does not modify the predetermined conditions and hence does not reduce the fuel consumption rate in correspondence with a plurality of types of fuel to be supplied. Such an issue is not known in the art.

SUMMARY OF THE INVENTION

The present invention has been made in view of the foregoing circumstances, and therefore provides a control device for a power transmission device for a vehicle that can reduce the fuel consumption rate in correspondence with a plurality of types of fuel to be supplied.

According to an aspect of the present invention, thus, there is provided a control device for a power transmission device for a vehicle that includes an electrical differential part that has a differential mechanism that is coupled between an internal combustion engine and a driving wheel and an electric motor that is coupled to the differential mechanism for power transmission, the electrical differential part controlling a differential state of the differential mechanism by controlling an operating state of the electric motor, and a differential restriction device that is capable of selectively switching the differential mechanism between a non-differential state in which a differential action of the differential mechanism is disabled and a differential enabled state in which the differential action of the differential mechanism is enabled, characterized by further including: a differential state control device that, in the case where the internal combustion engine is driven on a different type of fuel from a reference fuel that is prescribed as a fuel for driving the internal combustion engine and an output torque of the internal combustion engine is thus greater than the output torque of the internal combustion engine produced when the internal combustion engine is driven on the reference fuel, expands a non-differential range, on the basis of which the differential restriction device determines to switch the differential mechanism into the non-differential state, compared to the non-differential range for use when the internal combustion engine is driven on the reference fuel.

According to the control device for a power transmission device for a vehicle described above, in the case where the internal combustion engine is driven on a different type of fuel from a reference fuel that is prescribed as a fuel for driving the internal combustion engine and an output torque of the internal combustion engine is thus greater than the output torque of the internal combustion engine produced when the internal combustion engine is driven on the reference fuel, the differential state control device that is included in the control device expands a non-differential range, on the basis of which the differential restriction device determines to switch the differential mechanism into the non-differential state, compared to the non-differential range for use when the internal combustion engine is driven on the reference fuel. Thus, in the case where different types of fuel from the reference fuel, that is, a plurality of types of fuel are supplied to the internal combustion engine, the advantage of switching the differential mechanism between the differential enabled state and the non-differential state can be fully utilized in correspondence with the output characteristics of the internal combustion engine, which may vary in accordance with the fuel type. As a result, the fuel consumption rate can be reduced in correspondence with the plurality of types of fuel supplied to the internal combustion engine, for example.

Preferably, a second electric motor is coupled to a power transmission shaft, which transmits an output of the differential mechanism, to apply torque to the power transmission shaft.

Preferably, the different type of fuel from the reference fuel is ethanol or a fuel that is obtained by mixing the reference fuel and ethanol. The reference fuel may be gasoline, for example.

Preferably, the differential state control device expands the non-differential range as the output torque of the internal combustion engine becomes greater due to a difference in the type of fuel.

Preferably, the output torque of the internal combustion engine is detected on the basis of a reaction torque of the electric motor against the output torque of the internal combustion engine.

According to the control device for a power transmission device for a vehicle described above, the output torque of the internal combustion engine is detected on the basis of a reaction torque of the electric motor against the output torque of the internal combustion engine. Therefore, the output torque of the internal combustion engine can be detected easily by detecting the reaction torque of the electric motor from a control current value for the electric motor or the like.

Preferably, the output torque of the internal combustion engine is detected in the case where an amount of fuel in a fuel tank of the vehicle has increased.

According to the control device for a power transmission device for a vehicle described above, the output torque of the internal combustion engine is detected in the case where an amount of fuel in a fuel tank of the vehicle has increased. Therefore, the output torque is not always detected but detected as needed, reducing the load on the control device.

Preferably, the output torque of the internal combustion engine is detected in the case where a cap that closes a fuel filler for the fuel tank of the vehicle has been opened.

According to the control device for a power transmission device for a vehicle described above, the output torque of the internal combustion engine is detected in the case where a cap that closes a fuel filler for the fuel tank of the vehicle has been opened. Therefore, the output torque is not always detected but detected as needed, reducing the load on the control device.

Preferably, an automatic transmission part is provided in a part of a power transmission path from the internal combustion engine to the driving wheel.

According to the control device for a power transmission device for a vehicle described above, an automatic transmission part is provided in a part of a power transmission path from the engine to the driving wheels. Therefore, the range of the transmission ratio, within which the transmission ratio of the power transmission device can be changed, can be increased compared to the case where no automatic transmission part is provided, obtaining excellent fuel efficiency performance.

Preferably, the automatic transmission part is a speed shift transmission part that is capable of changing its transmission ratio stepwise.

According to the control device for a power transmission device for a vehicle described above, the automatic transmission part is a speed shift transmission part that is capable of changing its transmission ratio stepwise. Therefore, the range of the transmission ratio of the automatic transmission part can be increased without significantly increasing the size of the automatic transmission part.

Preferably, the electrical differential part functions as a continuously variable transmission that is capable of continuously varying its transmission ratio in the differential enabled state.

According to the control device for a power transmission device for a vehicle described above, the electrical differential part functions as a continuously variable transmission that is capable of continuously varying its transmission ratio in the differential enabled state. Therefore, it is possible to smoothly vary the driving torque output from the electrical differential part. The electrical differential part may also be configured to operate as a speed shift transmission with speed shift transmission ratios rather than operating as the continuously variable transmission.

Preferably, the internal combustion engine, the electrical differential part, the automatic transmission part, and the driving wheel are coupled sequentially in this order in the power transmission path between the internal combustion engine and the driving wheel.

Preferably, the differential mechanism is a planetary gear device that includes a first rotary element that is coupled to the internal combustion engine for power transmission, a second rotary element that is coupled to the electric motor for power transmission, and a third rotary element that is coupled to the driving wheel for power transmission. The first rotary element is a carrier of the planetary gear device, the second rotary element is a sun gear of the planetary gear device, and the third rotary element is a ring gear of the planetary gear device. With this configuration, the axial dimension of the differential mechanism can be reduced. In addition, the differential mechanism can be constructed simply with one planetary gear device.

Preferably, the planetary gear device is a single-pinion planetary gear device. With this configuration, the axial dimension of the differential mechanism can be reduced. In addition, the differential mechanism can be constructed simply with one single-pinion planetary gear device.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figures 1, 2:
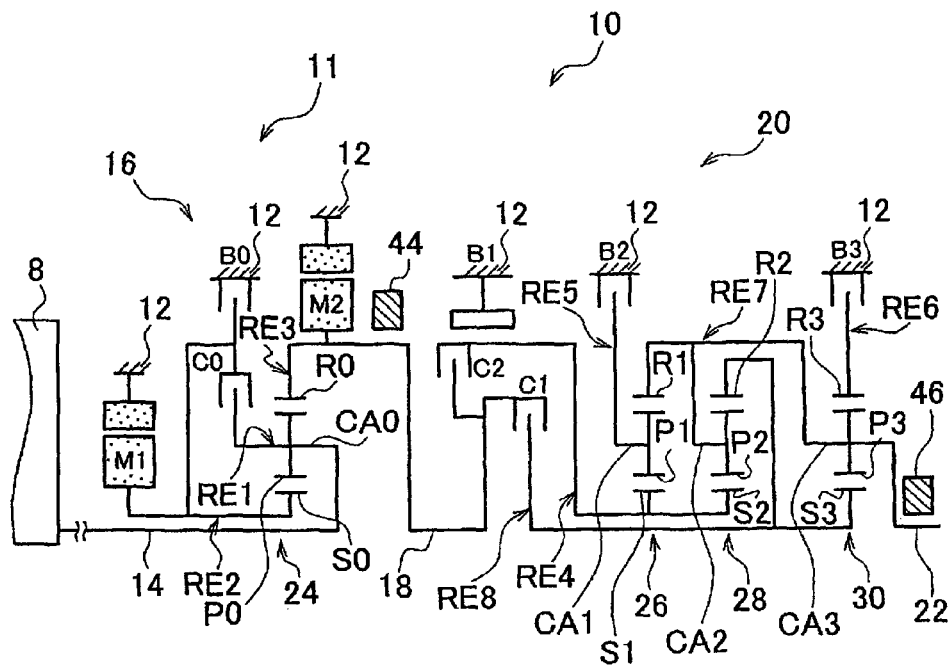
FIG. 1 is a skeleton diagram that illustrates a power transmission device for a vehicle to which a control device according to an embodiment of the present invention is applied.
FIG. 2 is a table that illustrates the relationship between the position established in the power transmission device for a vehicle of FIG. 1 in continuously variable or speed shift operation and the combination of the operating states of hydraulic friction engagement devices used in the power transmission device.

Hereinafter, an embodiment of the present invention will be described in detail with reference to the drawings.
A control device according to the present invention may be used in hybrid vehicles, for example. FIG. 1 is a skeleton diagram that illustrates a power transmission device 10 for a vehicle to which a control device according to the present invention is applied. As shown in FIG. 1, the power transmission device 10 includes an input shaft 14 as an input rotary member disposed on a common axis in a transmission case 12 (hereinafter referred to as "case 12") as a non-rotary member attached to the vehicle body, a differential part 11 coupled to the input shaft 14 directly or via a pulsation absorption damper (vibration attenuation device) (not shown), an automatic transmission part 20 coupled in series with the differential part 11 via a transmission member (transmission shaft) 18 in a power transmission path between the differential part 11 and driving wheels 38 (see FIG. 6), and an output shaft 22 as an output rotary member coupled to the automatic transmission part 20. These components of the power transmission device 10 are disposed in series with each other. The power transmission device 10 is suitably used in front-engine rear-drive (FR) vehicles with an engine disposed longitudinally in the vehicle. The power transmission device 10 is provided between an engine 8 which is an internal combustion engine such as a gasoline engine or a diesel engine and which serves as a driving power source for travel coupled to the input shaft 14 directly or via a pulsation absorption damper (not shown), and the pair of driving wheels 38 (see FIG. 6) to transmit power from the engine 8 to the left and right driving wheels 38 sequentially via a differential gear device (final speed reducer) 36, a pair of axles, etc., which constitute a part of the power transmission path.

As described above, the engine 8 and the differential part 11 are directly coupled to each other in the power transmission device 10 according to the embodiment. The language "(being) directly coupled to each other" means being coupled to each other with no hydraulic transmission device such as a torque converter or a fluid coupling interposed between each other, and includes "being coupled to each other via the pulsation absorption damper" mentioned above, for example. Because the power transmission device 10 is configured to be symmetric with respect to its axis, the lower portion of the power transmission device 10 is omitted in the skeleton diagram of FIG. 1.

The differential part 11 corresponds to the "electrical differential part" according to the present invention. The differential part 11 includes a power distribution mechanism 16 as a differential mechanism that mechanically distributes an output of the engine 8 input to the input shaft 14 to a first electric motor M1 and the transmission member 18, the first electric motor M1 coupled to the power distribution mechanism 16 for power transmission, and a second electric motor M2 that is rotatable together with the transmission member 18. The first electric motor M1 and the second electric motor M2 are each a so-called motor generator. The first electric motor M1 functions as a differential electric motor that controls the differential state of the power distribution mechanism 16, and provides at least a generator (power generation) function for generating a reaction force. The second electric motor M2 is coupled to the driving wheels 38 for power transmission, and provides at least a motor (electric motor) function in order to output driving power for travel as a driving power source. The first electric motor M1 corresponds to the "electric motor" according to the present invention.

The power distribution mechanism 16 corresponds to the "differential mechanism" according to the present invention. The power distribution mechanism 16 is a differential mechanism coupled between the engine 8 and the driving wheels 38, and mainly includes a single-pinion differential part planetary gear device 24 having a predetermined gear ratio ρ0 of about "0.418", for example, a changeover clutch C0, and a changeover brake B0. The differential part planetary gear device 24 includes, as its rotary elements (elements), a differential part sun gear S0, a differential part planetary gear P0, a differential part carrier CA0 that supports the differential part planetary gear P0 so as to be rotatable on its own axis and revolvable around an external axis, and a differential part ring gear R0 meshed with the differential part sun gear S0 via the differential part planetary gear P0. When the number of teeth of the differential part sun gear S0 is ZS0 and the number of teeth of the differential part ring gear R0 is ZR0, the gear ratio ρ0 is ZS0/ZR0. The changeover brake B0 corresponds to the "differential restriction device" according to the present invention.

In the power distribution mechanism 16, the differential part carrier CA0 is coupled to the input shaft 14, that is, the engine 8, the differential part sun gear S0 is coupled to the first electric motor M1, and the differential part ring gear R0 is coupled to the transmission member 18. The changeover brake B0 is provided between the differential part sun gear S0 and the case 12, and the changeover clutch C0 is provided between the differential part sun gear S0 and the differential part carrier CA0. When the changeover clutch C0 and the changeover brake B0 are disengaged, the power distribution mechanism 16 is in a differential enabled state in which the three elements of the differential part planetary gear device 24 (the differential part sun gear S0, the differential part carrier CA0, and the differential part ring gear R0) are rotatable relative to each other to enable a differential action, that is, the differential action is effected. Therefore, the output of the engine 8 is distributed to the first electric motor M1 and the transmission member 18, and a part of the output of the engine 8 distributed to the first electric motor M1 is used to generate electrical energy, which is in turn stored or used to rotationally drive the second electric motor M2. Consequently, the differential part 11 (power distribution mechanism 16) functions as an electrical differential device in, for example, a so-called continuously variable state (electrical CVT state) in which the rotational speed of the transmission member 18 is continuously variable irrespective of the rotational speed of the engine 8. That is, when the power distribution mechanism 16 is in the differential enabled state, the differential part 11 is also in the differential enabled state and hence in the continuously variable state in which the differential part 11 functions as an electrical continuously variable transmission with its transmission ratio γ0 (the rotational speed of the input shaft 14/the rotational speed of the transmission member 18) continuously variable between the minimum value γ0min and the maximum value γ0max. When the power distribution mechanism 16 is in the differential enabled state as described above, the operating state of the first electric motor M1 and/or the second electric motor M2 coupled to the power distribution mechanism 16 for power transmission, is controlled so as to control the differential state of the power distribution mechanism 16, that is, the differential state between the rotational speed of the input shaft 14 and the rotational speed of the transmission member 18.

When the changeover clutch C0 or the changeover brake B0 is engaged from this state, the power distribution mechanism 16 is brought into a non-differential state in which the power distribution mechanism 16 does not effect the differential action, that is, the differential action is disabled. Specifically, when the changeover clutch C0 is engaged to engage the differential part sun gear S0 and the differential part carrier CA0 together, the power distribution mechanism 16 is brought into the non-differential state in which the differential action is disabled with the three elements of the differential part planetary gear device 24 (the differential part sun gear S0, the differential part carrier CA0, and the differential part ring gear R0) rotatable together in a locked state, and thus the differential part 11 is also brought into, the non-differential state. Because the rotational speed of the engine 8 and the rotational speed of the transmission member 18 match each other, the differential part 11 (power distribution mechanism 16) is in a fixed ratio state, that is, a stepped ratio state, in which the differential part 11 (power distribution mechanism 16) functions as a transmission with a fixed transmission ratio γ0 of "1". When the changeover brake B0 is engaged, rather than the changeover clutch C0, to couple the differential part sun gear S0 to the case 12, the power distribution mechanism 16 is brought into the non-differential state in which the differential action is disabled with the differential part sun gear S0 non-rotatable in the locked state, and thus the differential part 11 is also brought into the non-differential state. Because the rotational speed of the differential part ring gear R0 is increased compared to the rotational speed of the differential part carrier CA0, the power distribution mechanism 16 functions as a speed increase mechanism, and the differential part 11 (power distribution mechanism 16) is in the fixed ratio state, that is, the stepped ratio state, in which the differential part 11 functions as a speed increaser with its transmission ratio γ0 fixed at a value less than "1", for example about 0.7.

In the embodiment, as described above, the changeover clutch C0 and the changeover brake B0 serve as a differential restriction device that selectively switches the differential part 11 (power distribution mechanism 16) between the differential enabled state, that is, the unlocked state, and the non-differential state, that is, the locked state. To put it another way, the changeover clutch C0 and the changeover brake B0 function as a differential state changeover device that selectively switches the differential part 11 (power distribution mechanism 16) between the differential enabled state in which the differential part 11 is operable as an electrical differential device, for example, the continuously variable state in which the differential part 11 is electrically operable as a continuously variable transmission with a continuously variable transmission ratio, and the fixed ratio state (non-differential state) in which the differential part 11 is not operable as a continuously variable transmission but operable in the locked state with fixed transmission ratios, that is, as a single-speed or multi-speed transmission with one or more fixed transmission ratios.

The automatic transmission part 20 functions as an automatic speed shift transmission capable of changing its transmission ratio (=rotational speed $N_{18}$ of the transmission member 18/rotational speed $N_{OUT}$ of the output shaft 22) stepwise, and constitutes a part of the power transmission path from the engine 8 to the driving wheels 38 as shown in FIG. 1. The automatic transmission part 20 includes a single-pinion first planetary gear device 26, a single-pinion second planetary gear device 28, and a single-pinion third planetary gear device 30. The first planetary gear device 26 includes a first sun gear S1, a first planetary gear P1, a first carrier CA1 that supports the first planetary gear P1 so as to be rotatable on its own axis and revolvable around an external axis, and a first ring gear R1 meshed with the first sun gear S1 via the first planetary gear P1, and has a predetermined gear ratio ρ1 of about "0.562", for example. The second planetary gear device 28 includes a second sun gear S2, a second planetary gear P2, a second carrier CA2 that supports the second planetary gear P2 so as to be rotatable on its own axis and revolvable around an external axis, and a second ring gear R2 meshed with the second sun gear S2 via the second planetary gear P2, and has a predetermined gear ratio ρ2 of about "0.425", for example. The third planetary gear device 30 includes a third sun gear S3, a third planetary gear P3, a third carrier CA3 that supports the third planetary gear P3 so as to be rotatable on its own axis and revolvable around an external axis, and a third ring gear R3 meshed with the third sun gear S3 via the third planetary gear P3, and has a predetermined gear ratio ρ3 of about "0.421", for example. When the number of teeth of the first sun gear S1 is ZS1, the number of teeth of the first ring gear R1 is ZR1, the number of teeth of the second sun gear S2 is ZS2, the number of teeth of the second ring gear R2 is ZR2, the number of teeth of the third sun gear S3 is ZS3, and the number of teeth of the third ring gear R3 is ZR3, the gear ratio ρ1 is ZS1/ZR1, the gear ratio ρ2 is ZS2/ZR2, and the gear ratio ρ3 is ZS3/ZR3.

In the automatic transmission part 20, the first sun gear S1 and the second sun gear S2 are integrally coupled to each other, selectively coupled to the transmission member 18 via the second clutch C2, and selectively coupled to the case 12 via the first brake B1. The first carrier CA1 is selectively coupled to the case 12 via the second brake B2. The third ring gear R3 is selectively coupled to the case 12 via the third brake B3. The first ring gear R1, the second carrier CA2, and the third carrier CA3 are integrally coupled, to each other, and coupled to the output shaft 22. The second ring gear R2 and the third sun gear S3 are integrally coupled to each other, and selectively coupled to the transmission member 18 via the first clutch C1. As described above, the automatic transmission part 20 and the transmission member 18 are selectively coupled to each other via the first clutch C1 and the second clutch C2 used to establish a gear position of the automatic transmission part 20. In other words, the first clutch C1 and the second clutch C2 function as an engagement device that selectively switches the power transmission path between the transmission member 18 and the automatic transmission part 20, that is, between the differential part 11 (transmission member 18) and the driving wheels 38, between a power transmission enabled state in which power transmission through the power transmission path is enabled and a power transmission blocked state in which power transmission through the power transmission path is blocked. That is, the power transmission path is in the power transmission enabled state when at least one of the first clutch C1 and the second clutch C2 is engaged, and in the power transmission blocked state when the first clutch C1 and the second clutch C2 are disengaged.

The changeover clutch C0, the first clutch C1, the second clutch C2, the changeover brake B0, the first brake B1, the second brake B2, and the third brake B3 are each a hydraulic friction engagement device commonly used in a conventional automatic speed shift transmission for a vehicle to selectively couple members disposed on both sides. The clutches and brakes mentioned above may each be a multiplate wet-type in which a plurality of friction plates are placed over each other to be pressed by a hydraulic actuator, or may be a band brake in which one or two bands are wound around the outer peripheral surface of a rotary drum to be tightened by pulling an end of the bands by means of a hydraulic actuator.

In the power transmission device 10 constructed as described above, the changeover clutch C0, the first clutch C1, the second clutch C2, the changeover brake B0, the first brake B1, the second brake B2, and the third brake B3 are selectively engaged as indicated in the engagement operation table of FIG. 2, for example, to selectively establish any one of a first gear (first speed) through a fifth gear (fifth speed) which each provide a transmission ratio γ (=input shaft rotational speed $N_{IN}$/output shaft rotational speed $N_{OUT}$) which increases generally geometrically, a reverse gear (reverse position), and a neutral position. In the embodiment, in particular, the power distribution mechanism 16 includes the changeover clutch C0 and the changeover brake B0, and the differential part 11 can operate in the fixed ratio state in which it functions as a transmission with fixed gear ratios, in addition to the continuously variable state discussed above in which it functions as a continuously variable transmission, by engaging either of the changeover clutch C0 and the changeover brake B0. Thus, the power transmission device 10 is brought into the stepped ratio state in which the differential part 11 in the fixed ratio state and the automatic transmission part 20 operate as a speed shift transmission by engaging either of the changeover clutch C0 and the changeover brake B0, and brought into the continuously variable state in which the differential part 11 in the continuously variable state and the automatic transmission part 20 operates as an electrical continuously variable transmission by engaging none of the changeover clutch C0 and the changeover brake B0. In other words, the power transmission device 10 is switched into the stepped ratio state by engaging either of the changeover clutch C0 and the changeover brake B0, and switched into the continuously variable state by engaging none of the changeover clutch C0 and the changeover brake B0: The differential part 11 is also a transmission that can be switched between the stepped ratio state and the continuously variable state.

For example, in the case where the power transmission device 10 functions as a speed shift transmission, the first gear with a transmission ratio γ1 of about "3.357", for example, which is highest, is established by engaging the changeover clutch C0, the first clutch C1, and the third brake B3 as shown in FIG. 2. When the changeover clutch C0, the first clutch C1, and the second brake B2 are engaged, the second gear with a transmission ratio γ2 of about "2.180", for example, which is lower than the transmission ratio with the first gear, is established. When the changeover clutch C0, the first clutch C1, and the first brake B1 are engaged, the third gear with a transmission ratio γ3 of about "1.424", for example, which is lower than the transmission ratio with the second gear, is established. When the changeover clutch C0, the first clutch C1, and the second clutch C2 are engaged, the fourth gear with a transmission ratio γ4 of about "1.000", for example, which is lower than the transmission ratio with the third gear, is established. When the first clutch C1, the second clutch C2, and the changeover brake B0 are engaged, the fifth gear with a transmission ratio γ5 of about "0.705", for example, which is lower than the transmission ratio with the fourth gear, is established. When the second clutch C2 and the third brake B3 are engaged, the reverse gear with a transmission ratio γR of about "3.209", for example, which is between the first gear and the second gear is established. In order to establish a neutral state, all the clutches and brakes C0, C1, C2, B0, B1, B2, B3 are disengaged, for example.

In the case where the power transmission device 10 functions as a continuously variable transmission, however, the changeover clutch C0 and the changeover brake B0 are both disengaged as indicated in the engagement operation table of FIG. 2. This allows the differential part 11 to function as a continuously variable transmission, and the automatic transmission part 20, which is connected in series with the differential part 11, to function as a speed shift transmission. Thus, the rotational speed input to the automatic transmission part 20, that is, the rotational speed of the transmission member 18, is continuously variable for each of the first gear, the second gear, the third gear, and the fourth gear of the automatic transmission part 20, providing each gear with a continuously variable transmission ratio range. Thus, a continuously variable transmission ratio is provided between the respective gears, providing the power transmission device 10 as a whole with a continuously variable total transmission ratio γT.

Figure 3:
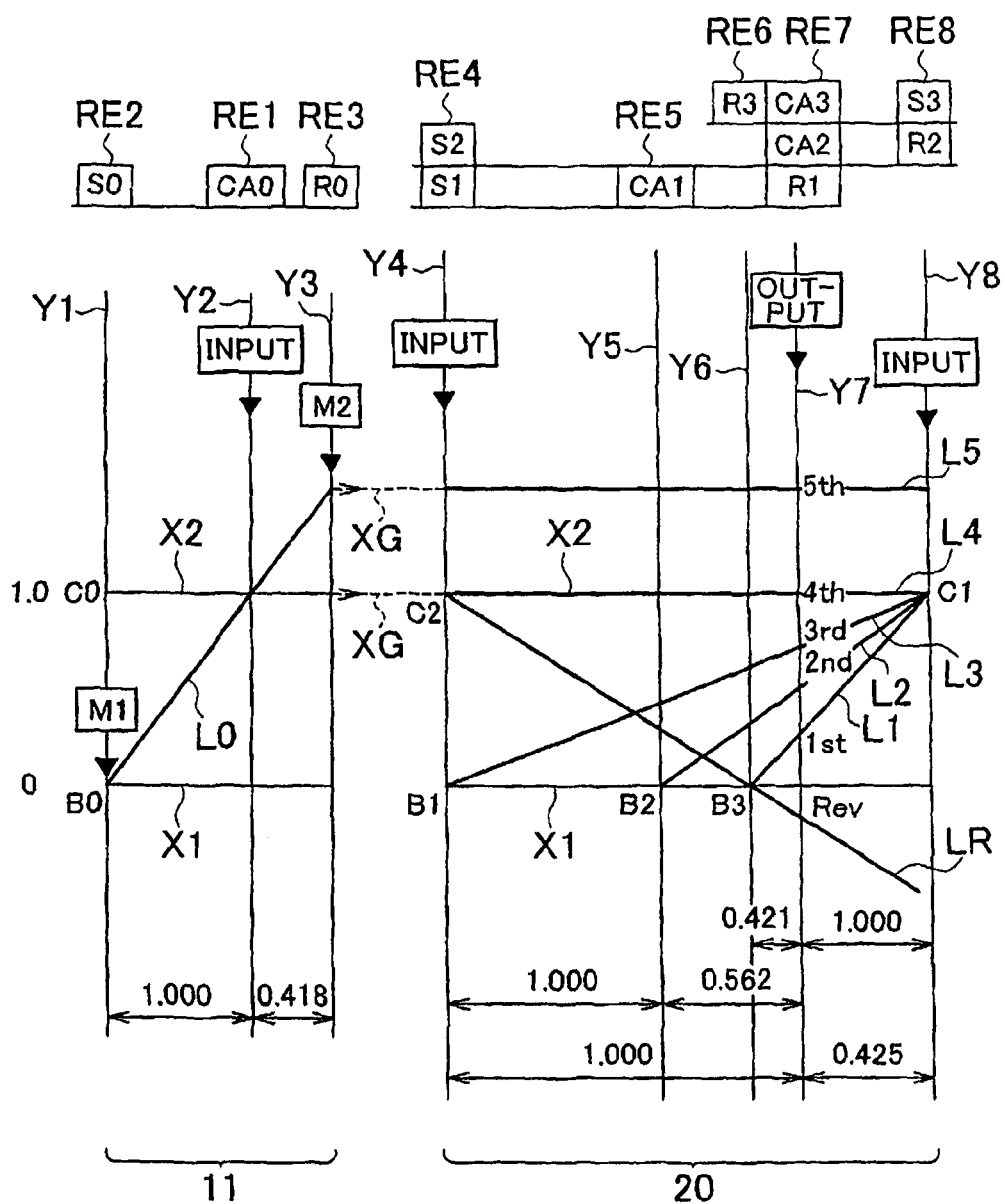
FIG. 3 is a collinear diagram that illustrates the relative rotational speeds of respective gears in the case where the power transmission device for a vehicle of FIG. 1 is in speed shift operation.

FIG. 3 is a collinear diagram that illustrates the correlation between the respective rotational speeds of the rotary elements, coupled differently for each gear, of the power transmission device 10 including the differential part 11 which functions as a continuously variable part or a first transmission part and the automatic transmission part 20 which functions as a speed shift transmission or a second transmission part. The collinear diagram of FIG. 3 has a two-dimensional coordinate system defined by a horizontal axis representing the relationship between the respective gear ratios ρ of the planetary gear devices 24, 26, 28, 30 and a vertical axis representing the relative rotational speed. Of the three horizontal lines, the lower horizontal line X1 indicates a rotational speed of "0", the upper horizontal line X2 indicates a rotational speed of "1.0", that is, the rotational speed $N_E$ of the engine 8 coupled to the input shaft 14, and the horizontal line XG indicates the rotational speed of the transmission member 18.

The three vertical lines Y1, Y2, Y3 correspond to the three elements of the power distribution mechanism 16 constituting the differential part 11, and indicate, sequentially from the left, the respective relative rotational speeds of the differential part sun gear S0 corresponding to the second rotary element (second element) RE2, the differential part carrier CA0 corresponding to the first rotary element (first element) RE1, and the differential part ring gear R0 corresponding to the third rotary element (third element) RE3. The intervals between the vertical lines are determined in accordance with the gear ratio ρ0 of the differential part planetary gear device 24. The five vertical lines Y4, Y5, Y6, Y7, Y8 for the automatic transmission part 20 respectively indicate, sequentially from the left, the first sun gear S1 and the second sun gear S2 corresponding to the fourth rotary element (fourth element) RE4 and coupled to each other, the first carrier CA1 corresponding to the fifth rotary element (fifth element) RE5, the third ring gear R3 corresponding to the sixth rotary element (sixth element) RE6, the first ring gear R1, the second carrier CA2, and the third carrier CA3 corresponding to the seventh rotary element (seventh element) RE7 and coupled to each other, and the second ring gear R2 and the third sun gear S3 corresponding to the eighth rotary element (eighth element) RE8 and coupled to each other. The intervals between the vertical lines are determined in accordance with the respective gear ratios $\rho 1$, $\rho 2$, $\rho 3$ of the first, second, and third planetary gear devices 26, 28, 30. When the interval between the sun gear and the carrier corresponds to "1" in the relationship defined by the vertical lines of the collinear diagram, the interval between the carrier and the ring gear corresponds to the gear ratio $\rho$ of the planetary gear device. That is, when the interval between the vertical lines Y1 and Y2 is set to "1" in the differential part 11, the interval between the vertical lines Y2 and Y3 is set to the gear ratio $\rho 0$. Meanwhile, when the interval between the sun gear and the carrier is set to "1" in the automatic transmission part 20 for each of the first, second, and third planetary gear devices 26, 28, 30, the interval between the carrier and the ring gear is set to $\rho$.

As represented in the collinear diagram of FIG. 3, the power transmission device 10 according to the embodiment is configured such that in the power distribution mechanism 16 (differential part 11), the first rotary element RE1 (differential part carrier CA0) of the differential part planetary gear device 24 is coupled to the input shaft 14 (that is, the engine 8) and selectively coupled to the second rotary element RE2 (differential part sun gear S0) via the changeover clutch C0, the second rotary element RE2 is coupled to the first electric motor M1 and selectively coupled to the case 12 via the changeover brake B0, and the third rotary element RE3 (differential part ring gear R0) is coupled to the transmission member 18 and the second electric motor M2, allowing rotation of the input shaft 14 to be transmitted (input) to the automatic transmission part (speed shift transmission part) 20 via the transmission member 18. The oblique line L0, which passes through the intersection point of Y2 and X2, indicates the relationship between the rotational speed of the differential part sun gear S0 and the rotational speed of the differential part ring gear R0.

For example, in the case where the changeover clutch C0 and the changeover brake B0 are disengaged for switching into the continuously variable state (differential enabled state), when the rotational speed of the differential part sun gear S0, which is indicated by the intersection point of the line L0 and the vertical line Y1, is raised or lowered by controlling the rotational speed of the first electric motor M1 with the rotational speed of the differential part ring gear R0 constrained by the vehicle speed V and thus generally constant, the rotational speed of the differential part carrier CA0, which is indicated by the intersection point of the line L0 and the vertical line Y2, is also raised or lowered. In the case where the changeover clutch C0 is engaged to couple the differential part sun gear S0 and the differential part carrier CA0, the power distribution mechanism 16 is brought into the non-differential state in which the three rotary elements mentioned above rotate together, and thus the line L0 matches the horizontal line X2, allowing the transmission member 18 to rotate at the same speed as the engine speed $N_E$. In the case where the changeover brake B0 is engaged to stop the rotation of the differential part sun gear S0, the power distribution mechanism 16 is brought into the non-differential state in which it functions as a speed increase mechanism, and thus the line L0 is brought into the state shown in FIG. 3, allowing the rotational speed of the differential part ring gear R0 (that is, the transmission member 18), which is indicated by the intersection point of the line L0 and the vertical line Y3, to be increased to be higher than the engine speed $N_E$ and input to the automatic transmission part 20.

In the automatic transmission part 20, the fourth rotary element RE4 is selectively coupled to the transmission member 18 via the second clutch C2 and selectively coupled to the case 12 via the first brake B1. The fifth rotary element RE5 is selectively coupled to the case 12 via the second brake B2. The sixth rotary element RE6 is selectively coupled to the case 12 via the third brake B3. The seventh rotary element RE7 is coupled to the output shaft 22. The eighth rotary element RE8 is selectively coupled to the transmission member 18 via the first clutch C1.

In the automatic transmission part 20, as shown in FIG. 3, in the case where the first clutch C1 and the third brake B3 are engaged, the rotational speed of the output shaft 22 with the first speed is indicated by the intersection point of the oblique line L1 which passes through the intersection point of the vertical line Y8 indicating the rotational speed of the eighth rotary element RE8 and the horizontal line X2 and the intersection point of the vertical line Y6 indicating the rotational speed of the sixth rotary element RE6 and the horizontal line X1, and the vertical line Y7 indicating the rotational speed of the seventh rotary element RE7 coupled to the output shaft 22. Likewise, the rotational speed of the output shaft 22 with the second speed is indicated by the intersection point of the oblique line L2 determined with the first clutch C1 and the second brake B2 engaged and the vertical line Y7 indicating the rotational speed of the seventh rotary element RE7 coupled to the output shaft 22. The rotational speed of the output shaft 22 with the third speed is indicated by the intersection point of the oblique line L3 determined with the first clutch C1 and the first brake B1 engaged and the vertical line Y7 indicating the rotational speed of the seventh rotary element RE7 coupled to the output shaft 22. The rotational speed of the output shaft 22 with the fourth speed is indicated by the intersection point of the horizontal line L4 determined with the first clutch C1 and the second clutch C2 engaged and the vertical line Y7 indicating the rotational speed of the seventh rotary element RE7 coupled to the output shaft 22. With the first to fourth speeds, the changeover clutch C0 is engaged, and thus power from the differential part 11, that is, the power distribution mechanism 16 is input to the eighth rotary element RE8 at the same rotational speed as the engine speed $N_E$. In the case where the changeover brake B0 is engaged rather than the changeover clutch C0, however, power from the differential part 11 is input at a rotational speed higher than the engine speed $N_E$. Thus, the rotational speed of the output shaft 22 with the fifth speed is indicated by the intersection point of the horizontal line L5 determined with the first clutch C1, the second clutch C2, and the changeover brake B0 engaged and the vertical line Y7 indicating the rotational speed of the seventh rotary element RE7 coupled to the output shaft 22.

Figure 4:
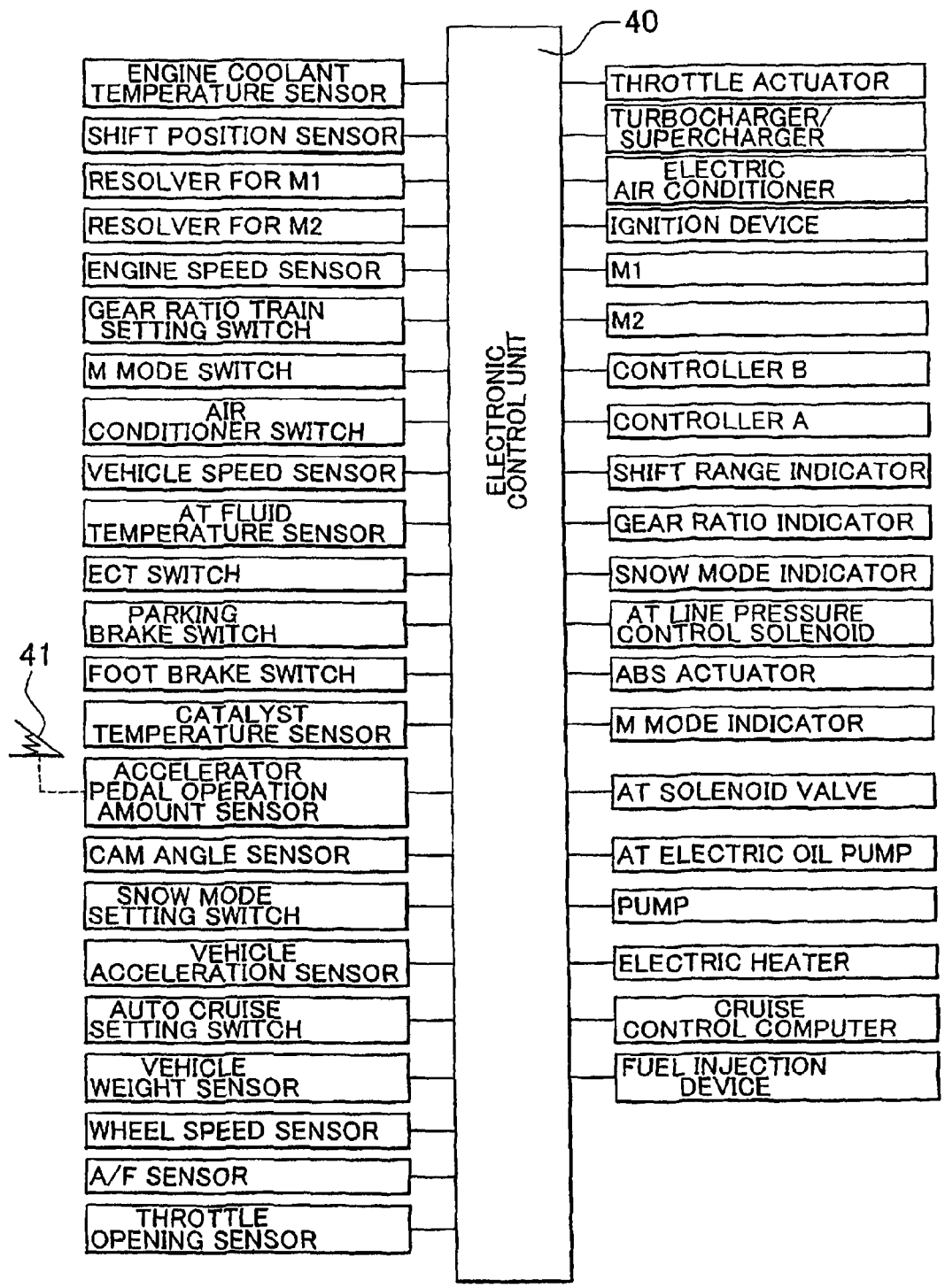
FIG. 4 illustrates signals input to and output from an electronic control device provided in the power transmission device for a vehicle of FIG. 1.

FIG. 4 shows exemplary signals input to and output from an electronic control unit 40 as the control device that controls the power transmission device 10 according to the present invention. The electronic control unit 40 includes a microcomputer including a CPU, a ROM, a RAM, and an input/output interface. The electronic control unit 40 performs signal processing in accordance with a program stored in advance in the ROM utilizing a temporal storage function of the RAM to execute various drive control such as hybrid drive control of the engine 8, the first electric motor M1, and the second electric motor M2 and gear change control of the automatic transmission part 20.

The electronic control unit 40 receives, from the sensors and switches shown in FIG. 4, various signals including: a signal indicating the engine coolant temperature $TEMP_W$, a signal indicating the shift position $P_{SH}$, a signal indicating the rotational speed $N_{M1}$ of the first electric motor M1 (hereinafter referred to as "first electric motor speed $N_{M1}$") and the rotational direction of the first electric motor M1 detected by a rotational speed sensor such as a resolver, a signal indicating the rotational speed $N_{M2}$ of the second electric motor M2 (hereinafter referred to as "second electric motor speed $N_{M2}$") and the rotational direction of the second electric motor M2 detected by a rotational speed sensor 44 (see FIG. 1) such as a resolver, a signal indicating the engine speed $N_E$ as the rotational speed of the engine 8, a signal indicating a gear ratio train setting value, a signal that commands an M mode (manual transmission mode), an air conditioner signal indicating the operating state of an air conditioner, a signal indicating the vehicle speed V corresponding to the rotational speed $N_{OUT}$ of the output shaft 22 detected by a vehicle speed sensor 46 (see FIG. 1) and the advancing direction of the vehicle, a hydraulic fluid temperature signal indicating the temperature of a hydraulic fluid for the automatic transmission part 20, a signal indicating a parking brake operation, a signal indicating a foot brake operation, a catalyst temperature signal indicating the temperature of a catalyst, an accelerator pedal operation amount signal indicating the amount of operation of an accelerator pedal 41 (accelerator pedal operation amount) corresponding to the amount of output required by the driver, a cam angle signal, a snow mode setting signal indicating the snow mode setting, an acceleration signal indicating the forward/backward acceleration of the vehicle, an auto-cruise signal indicating auto-cruise travel, a vehicle weight signal indicating the weight of the vehicle, a wheel speed signal indicating the wheel speed of each wheel, and a signal indicating the air-fuel ratio A/F of the engine 8. The rotational speed sensor 44 and the vehicle speed sensor 46 can detect not only the rotational speed but also the rotational direction. When the automatic transmission part 20 is in the neutral position while the vehicle is traveling, the vehicle speed sensor 46 detects the advancing direction of the vehicle.

Meanwhile, the electronic control unit 40 outputs various signals including: a control signal for an engine output control device 43 (see FIG. 6) that controls the engine output such as a drive signal for a throttle actuator 97 that operates the opening degree $\theta_{TH}$ of an electronic throttle valve 96 provided in an intake pipe 95 of the engine 8, a fuel supply amount signal for controlling the amount of fuel to be supplied into each cylinder of the engine 8 by a fuel injection device 98, and an ignition signal for commanding the timing of ignition of the engine 8 performed by an ignition device 99, a boost pressure adjustment signal for adjusting the boost pressure, an electric air conditioner drive signal for actuating an electric air conditioner, a command signal for commanding operation of the electric motors M1 and M2, a shift position (operating position) display signal for actuating a shift indicator, a gear ratio display signal for displaying the gear ratio, a snow mode display signal for displaying that the snow mode is effected, an ABS actuation signal for actuating an ABS actuator that prevents the wheel from slipping during braking operation, an M mode display signal for displaying that the M mode is selected, a valve command signal for actuating an electromagnetic valve included in a hydraulic control circuit 42 (see FIG. 6) to control the hydraulic actuators for the hydraulic friction engagement devices of the differential part 11 and the automatic transmission part 20, a drive command signal for actuating an electric hydraulic pump as a hydraulic pressure source for the hydraulic control circuit 42, a signal for driving an electric heater, and a signal for a computer for cruise control.

Figure 5:
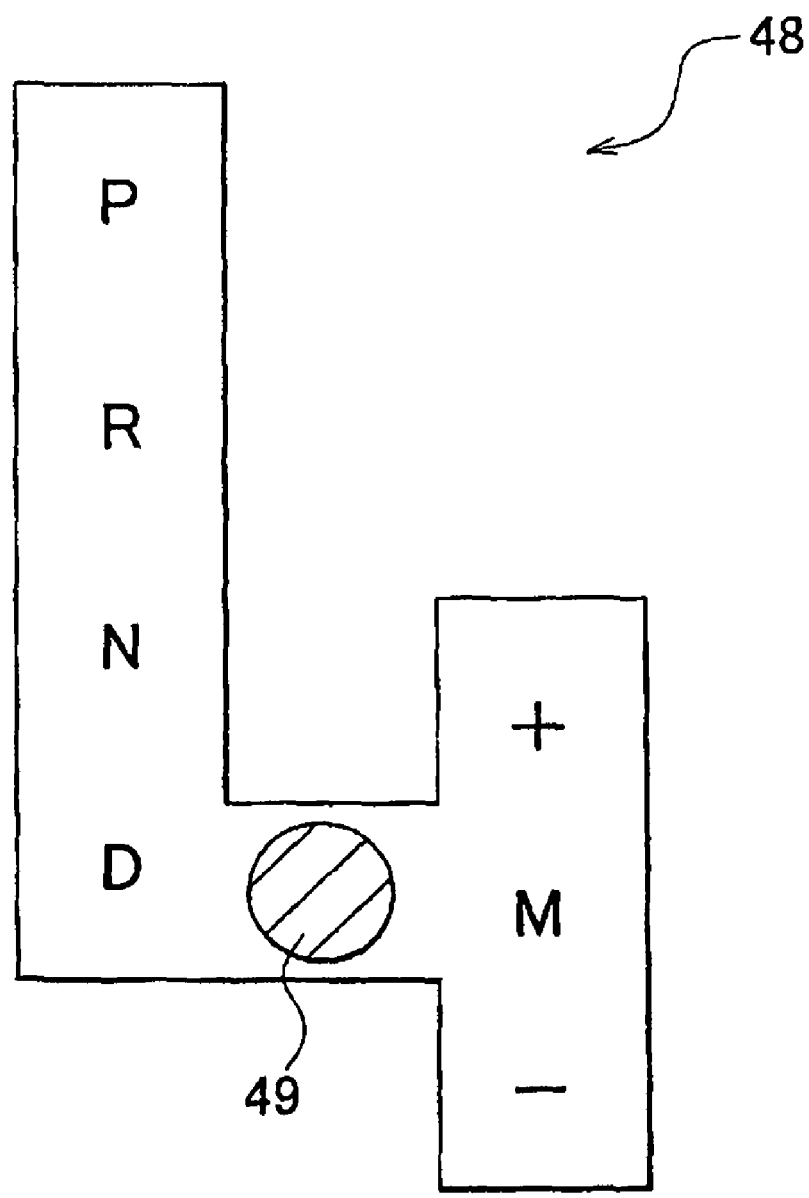
FIG. 5 shows an exemplary shift operation device that allows selection of a plurality of shift positions and includes a shift lever for shift operation of the power transmission device for a vehicle of FIG. 1.

FIG. 5 shows an example of a shift operation device 48 as a switching device used to switch between a plurality of shift positions $P_{SH}$ through a manual operation. The shift operation device 48 is disposed at a side of the driver's seat, for example, and includes a shift lever 49 operable to select among the plurality of shift positions $P_{SH}$.

The shift lever 49 is manually operable to establish a parking position "P" in which the power transmission path in the power transmission device 10, that is, in the automatic transmission part 20, is blocked in the neutral state and the output shaft 22 of the automatic transmission part 20 is locked, a backward travel position "R" used for backward travel, a neutral position "N" in which the power transmission path in the power transmission device 10 is blocked in the neutral state, a forward automatic transmission travel position "D" in which the transmission ratio of the power transmission device 10 is automatically controlled within the variable range of the total transmission ratio $\gamma T$, or a forward manual transmission travel position "M" in which a manual transmission travel mode (manual mode) is established to restrict the high-speed side of the transmission ratio in the automatic transmission control described above, in other words, to set a so-called transmission range.

The hydraulic control circuit 42 is electrically operable, for example, to engage the reverse gear "R", the neutral position "N", and each gear in the forward gear "D" indicated in the engagement operation table of FIG. 2 in conjunction with a manual operation of the shift lever 49 into each shift position $P_{SH}$.

Of the shift positions $P_{SH}$ including the "P" to "M" positions, the "P" position and the "N" position are a non-travel position selected when the vehicle is not to be driven, which is a non-driving position selected to switch the power transmission path into the power transmission blocked state using the first clutch C1 and the second clutch C2, making the vehicle non-drivable with the power transmission path in the automatic transmission part 20 blocked with both the first clutch C1 and the second clutch C2 disengaged as indicated in the engagement operation table of FIG. 2, for example. Meanwhile, the "R" position, the "D" position, and the "M" position are a travel position selected when the vehicle is to be driven, which is a driving position selected to switch the power transmission path into the power transmission enabled state using the first clutch C1 and/or the second clutch C2, making the vehicle drivable with the power transmission path in the automatic transmission part 20 coupled with at least one of the first clutch C1 and the second clutch C2 engaged as indicated in the engagement operation table of FIG. 2, for example.

Specifically, when the shift lever 49 is manually operated from the "P" position or the "N" position to the "R" position, the second clutch C2 is engaged to bring the power transmission path in the automatic transmission part 20 from the power transmission blocked state into the power transmission enabled state. When the shift lever 49 is manually operated from the "N" position to the "D" position, at least the first clutch C1 is engaged to bring the power transmission path in the automatic transmission part 20 from the power transmission blocked state into the power transmission enabled state. When the shift lever 49 is manually operated from the "R" position to the "P" position or the "N" position, the second clutch C2 is disengaged to bring the power transmission path in the automatic transmission part 20 from the power transmission enabled state into the power transmission blocked state. When the shift lever 49 is manually operated from the "D" position to the "N" position, the first clutch C1 and the second clutch C2 are disengaged to bring the power transmission path in the automatic transmission part 20 from the power transmission enabled state into the power transmission blocked state.

Figure 6:
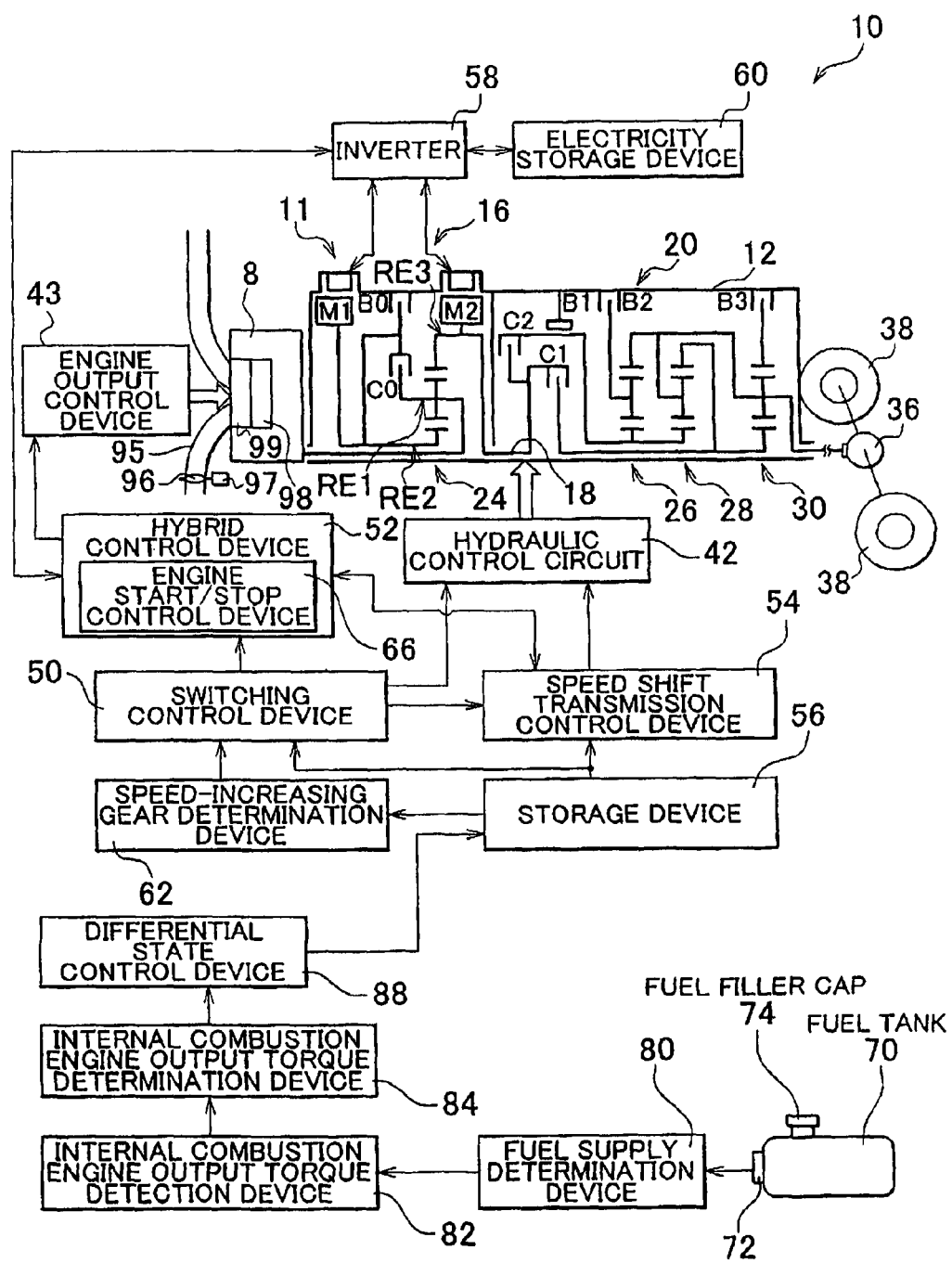
FIG. 6 is a functional block and line diagram that illustrates essential portions for control functions provided by the electronic control device of FIG. 4.

FIG. 6 is a functional block and line diagram that illustrates essential portions for control functions provided by the electronic control device 40. A speed shift transmission control device 54 in FIG. 6 functions as a transmission control device that performs a gearshift of the automatic transmission part 20. For example, the speed shift transmission control device 54 determines whether or not to execute a gearshift of the automatic transmission part 20, that is, which gear should be engaged in the automatic transmission part 20, on the basis of the vehicle state indicated by the vehicle speed V and the required output torque $T_{OUT}$ of the automatic transmission part 20 obtained from the relationship (gearshift line chart, gearshift map) indicated by the solid line and the single-dashed line in FIG. 7 stored in advance in the storage device 56. The speed shift transmission control device 54 executes a gearshift of the automatic transmission part 20 to engage the determined gear. At this time, the speed shift transmission control device 54 outputs to the hydraulic control circuit 42 a command (gearshift output command) for engaging and/or disengaging the hydraulic friction engagement devices except for the changeover clutch C0 and the changeover brake B0 so as to engage the determined gear in accordance with the engagement operation table shown in FIG. 2, for example. Because the accelerator pedal operation amount Acc and the required output torque $T_{OUT}$ of the automatic transmission part 20 (vertical axis of FIG. 7) are correlated such that the required output torque $T_{OUT}$ increases as the accelerator pedal operation amount Acc increases, the vertical axis of the gearshift line chart of FIG. 7 may be the accelerator pedal operation amount Acc.

A hybrid control device 52 drives the engine 8 in an efficient operating range with the power transmission device 10 in the continuously variable state, that is, with the differential part 11 in the differential enabled state, and controls the transmission ratio γ0 of the differential part 11 as an electrical continuously variable transmission by optimally changing the distribution between the driving forces of the engine 8 and the second electric motor M2 and the reaction force as a result of power generation performed by the first electric motor M1. For example, the hybrid control device 52 calculates, at the current vehicle speed, a target (required) output of the vehicle on the basis of the accelerator pedal operation amount Acc as the amount of output required by the driver and the vehicle speed V, then calculates a required total target output on the basis of the target output of the vehicle and a required charge value, then calculates a target engine output for obtaining the total target output in consideration of the transmission loss, load due to auxiliary equipment, assist torque provided by the second electric motor M2, etc., and controls the engine 8 so as to achieve the engine speed $N_E$ and the engine torque $T_E$ for obtaining the target engine output and controls the power generation amount of the first electric motor M1.

The hybrid control device 52 executes the control in consideration of the gear of the automatic transmission part 20 to improve the kinetic performance and the fuel efficiency. In such hybrid control, the differential part 11 is caused to function as an electrical continuously variable transmission in order to match the engine speed $N_E$ determined to drive the engine 8 in an efficient operating range with the rotational speed of the transmission member 18 determined by the vehicle speed V and the gear of the automatic transmission part 20. That is, the hybrid control device 52 stores in advance an optimum fuel efficiency curve (fuel efficiency map, relationship), which is a type of an operation curve of the engine 8 determined in advance experimentally in a two-dimensional coordinate system defined by the engine speed $N_E$ and the output torque (engine torque) $T_E$ of the engine 8 as parameters, for example, to achieve both the drivability and the fuel efficiency. The hybrid control device 52 then determines the target value of the total transmission ratio γT of the power transmission device 10 to achieve the engine torque $T_E$ and the engine speed $N_E$ so as to drive the engine 8 with the operating point of the engine 8 (hereinafter referred to as "engine operation point") following the optimum fuel efficiency curve, for example, so as to generate an engine output required to satisfy the target output (total target output, required driving force). The hybrid control device 52 then controls the transmission ratio γ0 of the differential part 11 so as to obtain the target value, controlling the total transmission ratio γT within the variable range of 13 to 0.5, for example. The term "engine operation point" refers to an operation point indicating the operating state of the engine 8 defined in a two-dimensional coordinate system with coordinate axes corresponding to state amounts indicating the operating state of the engine 8 such as the engine speed $N_E$ and the engine torque $T_E$.

At this time, the hybrid control device 52 supplies the electrical energy generated by the first electric motor M1 through an inverter 58 to an electricity storage device 60 and the second electric motor M2. Therefore, while the main part of the power from the engine 8 is mechanically transmitted to the transmission member 18, part of the power from the engine 8 is consumed for the first electric motor M1 to generate electricity and converted into electrical energy, which in turn is supplied through the inverter 58 to the second electric motor M2, which in turn is driven to transmit power from the second electric motor M2 to the transmission member 18. Devices associated with the generation to the consumption (by the second electric motor M2) of the electrical energy constitute an electricity path in which a part of the power from the engine 8 is converted into electrical energy and the electrical energy is converted into mechanical energy.

The hybrid control device 52 functionally includes an engine output control device that executes output control for the engine 8 so as to generate the required engine output by outputting to the engine output control device 43 a command for performing opening/closing control of the electronic throttle valve 96 by means of the throttle actuator 97 for throttle control, controlling the amount and timing of fuel injection performed by the fuel injection device 98 for fuel injection control, and controlling the timing of ignition performed by the ignition device 99 such as an igniter for ignition timing control, singly or in combination. For example, the hybrid control device 52 drives the throttle actuator 97 on the basis of the accelerator pedal operation amount signal Acc basically using the relationship (not shown) stored in advance to execute throttle control so as to increase the throttle valve opening $\theta_{TH}$ as the accelerator pedal operation amount Acc increases.

Figure 7:
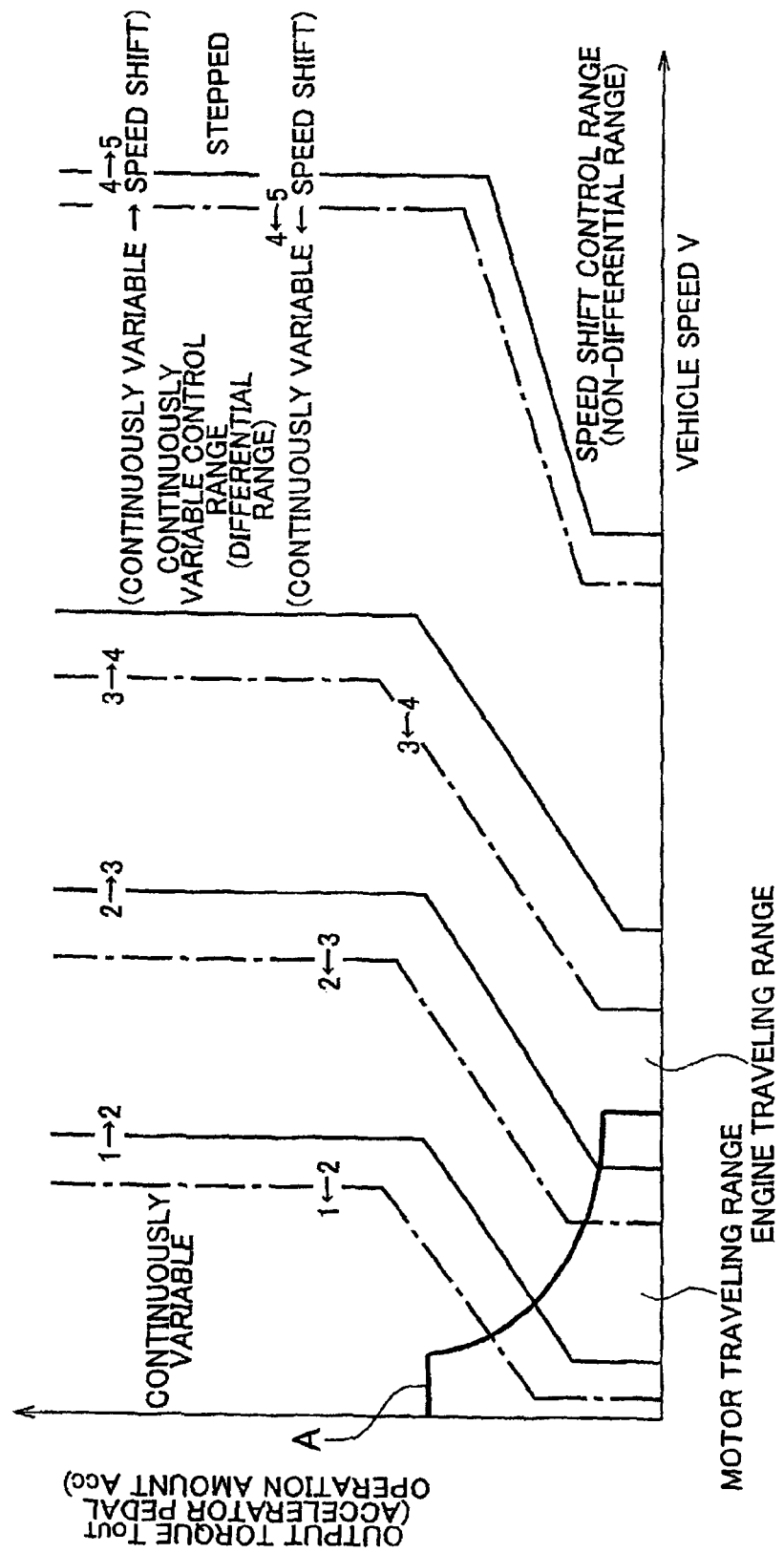
FIG. 7 shows an exemplary gearshift line chart on the basis of which a gearshift of an automatic transmission part is determined and which is stored in advance, an exemplary switching line chart for switching the power transmission device between a continuously variable state and a stepped ratio state, and an exemplary driving power source switching line chart that has a boundary line between an engine traveling range and a motor traveling range for switching between engine travel and motor travel and stored in advance, showing the relationship between the charts which are associated with the power transmission device for a vehicle of FIG. 1 and which are defined in the same two-dimensional coordinate system with the vehicle speed and the output torque as parameters.

The thick solid line A in FIG. 7 is a boundary line between the engine traveling range and the motor traveling range for switching the driving power source for start/travel (hereinafter simply referred to as "travel") of the vehicle between the engine 8 and an electric motor, for example the second electric motor M2, in other words, for switching between so-called engine travel in which the vehicle starts/travels (hereinafter simply referred to as "travels") on the engine 8 as the driving power source for travel and so-called motor travel in which the vehicle travels on the second electric motor M2 as the driving power source for travel. The relationship shown in FIG. 7, stored in advance and having the boundary line (solid line A) for switching the engine travel and the motor travel, is an example of a driving power source switching line chart (driving power source map) constituted in a two-dimensional coordinate system with the vehicle speed V and the output torque $T_{OUT}$ as a driving power associated value as parameters. The driving power source switching line chart is stored in advance in the storage device 56 together with the gearshift line chart (gearshift map) indicated by the solid lines and the single-dashed lines in the same FIG. 7, for example.

The hybrid control device 52 determines whether the vehicle is in the motor traveling range or the engine traveling range on the basis of the vehicle state indicated by the vehicle speed V and the required output torque $T_{OUT}$ using the driving power source switching line chart of FIG. 7, for example, to execute the motor travel or the engine travel. As is clear from FIG. 7, the hybrid control device 52 executes the motor travel in a range where the output torque $T_{OUT}$ (that is, the engine torque $T_E$) is relatively low, in which the engine efficiency is generally considered to be low compared to the high torque range, or where the vehicle speed V (that is, the load) is relatively low.

In order to suppress dragging due to the engine 8 which is stationary during the motor travel to improve the fuel efficiency, the hybrid control device 52 controls the first electric motor speed $N_{M1}$ to a negative rotational speed, for example, to an idling state, through the electrical CVT function (differential action) of the differential part 11 to maintain the engine speed $N_E$ at 0 or generally 0 through the differential action of the differential part 11.

In order to switch between the engine travel and the motor travel, the hybrid control device 52 includes an engine start/stop control device 66 that switches the operating state of the engine 8 between the operating state and the stationary state, that is, starts and stops the engine 8. The engine start/stop control device 66 starts or stops the engine 8 when the hybrid control device 52 has determined to switch between the motor travel and the engine travel on the basis of the vehicle state using the driving power source switching line chart of FIG. 7, for example.

Even in the engine traveling range, the hybrid control device 52 can provide a torque assist by supplying the second electric motor M2 with electrical energy from the first electric motor M1 through the electricity path discussed above and/or electrical energy from the electricity storage device 60 and driving the second electric motor M2 to assist the power from the engine 8. In the embodiment, thus, the engine travel, rather than the motor travel, includes the state in which the vehicle travels on both the engine 8 and the second electric motor M2 as the driving power source for travel.

The hybrid control device 52 can maintain the operating state of the engine 8 through the electrical CVT function of the differential part 11 irrespective of whether the vehicle is in the stationary state or the vehicle speed is low. For example, in the case where the remaining charge amount SOC of the electricity storage device 60 is so lowered as to require electricity generation by the first electric motor M1 while the vehicle is stationary, the first electric motor M1 is caused to generate electricity using power from the engine 8, which increases the rotational speed of the first electric motor M1. Thus, the engine speed $N_E$ is maintained at a rotational speed enabling autonomous rotation or higher by the differential action of the power distribution mechanism 16 even if the second electric motor speed $N_{M2}$, which is uniquely determined by the vehicle speed V, is 0 (generally 0) because the vehicle is stationary.

The hybrid control device 52 can maintain the engine speed $N_E$ to an arbitrary rotational speed by controlling the first electric motor speed $N_{M1}$ and/or the second electric motor speed $N_{M2}$ through the electrical CVT function of the differential part 11 irrespective of whether the vehicle is stationary or traveling. For example, as can be seen from the collinear diagram of FIG. 3, the hybrid control device 52 increases the first electric motor speed $N_{M1}$ while maintaining the second electric motor speed $N_{M2}$, which is constrained by the vehicle speed V, generally constant in order to increase the engine speed $N_E$.

In order to determine whether or not to engage the changeover brake B0, a speed-increasing gear determination device 62 determines whether or not the gear to be engaged in the power transmission device 10 is higher than the current gear, for example the fifth gear, on the basis of the vehicle state, for example, using the gearshift line chart shown in FIG. 7 stored in advance in the storage device 56.

A switching control device 50 switches engagement/disengagement of the differential state changeover device (the changeover clutch C0, the changeover brake B0) on the basis of the vehicle state indicated by the vehicle speed V and the required output torque $T_{OUT}$ to selectively switch the power transmission device 10 between the continuously variable state and the stepped ratio state, that is, selectively switch the power distribution mechanism 16 between the differential enabled state and the locked state.

For example, in the case where the speed-increasing gear determination device 62 determines using the gearshift line diagram (see FIG. 7) that the gear to be engaged in the power transmission device 10 is the fifth gear, that is, the point indicating the relationship between the vehicle speed V and the required output torque $T_{OUT}$ in FIG. 7 has moved across an upshift line from the fourth speed to the fifth speed, in other words, the point indicating the above relationship has entered into the speed shift control range (non-differential range) of FIG. 7, the switching control device 50 outputs to the hydraulic control circuit 42 a command for engaging the changeover brake B0 while keeping the changeover clutch C0 disengaged to cause the differential part 11 to function as a secondary transmission with a fixed transmission ratio γ0, for example a transmission ratio γ0 of 0.7, that is, switches the power transmission device 10 into the stepped ratio state. Meanwhile, in the case where the required output torque $T_{OUT}$ has exceeded a predetermined determination output torque T1 when the power transmission device 10 is in the continuously variable state, the switching control device 50 may engage the changeover clutch C0 to switch the power transmission device 10 into the stepped ratio state, although not shown in FIG. 7. At this time, the determination output torque T1 is a value experimentally set to determine whether or not the fuel consumption rate is reduced with the transmission ratio γ0 of the differential part 11 fixed at 1, for example.

Meanwhile, in the case where the speed-increasing gear determination device 62 determines that the gear to be engaged in the power transmission device 10 is not the fifth gear, that is, the point indicating the relationship between the vehicle speed V and the required output torque $T_{OUT}$ in FIG. 7 has moved across a downshift line from the fifth speed to the fourth speed, in other words, the point indicating the above relationship has entered into the continuously variable control range (differential range) of FIG. 7, the switching control device 50 outputs to the hydraulic control circuit 42 a command for disengaging the changeover brake B0 while keeping the changeover clutch C0 disengaged, that is, switches the power transmission device 10 into the continuously variable state. At this time, the differential part 11, which has been switched into the continuously variable state by the switching control device 50, functions as a continuously variable transmission, and the automatic transmission part 20, which is connected in series with the differential part 11, functions as a speed shift transmission. Thus, in addition to the fact that driving force with an appropriate magnitude can be obtained, the rotational speed input to the automatic transmission part 20, that is, the rotational speed of the transmission member 18, is continuously variable for each of the first gear, the second gear, the third gear, and the fourth gear of the automatic transmission part 20, providing each gear with a continuously variable transmission ratio range. Thus, a continuously variable transmission ratio is provided between the respective gears, bringing the power transmission device 10 as a whole into the continuously variable state and providing it with a continuously variable total transmission ratio $\gamma T$.

A detailed description is now made with reference to FIG. 7, which is an exemplary gearshift line chart constituted in a two-dimensional coordinate system with the vehicle speed V and the required output torque $T_{OUT}$ as a driving power associated value as parameters showing the relationship (gearshift line chart, gearshift map) which is stored in advance in the storage device 56 and on the basis of which a gearshift of the automatic transmission part 20 is determined. In FIG. 7, the solid lines are each an upshift line, and the single-dashed lines are each a downshift line. In the gearshift line chart, the range from the first gear to the fourth gear is a continuously variable control range (differential range) in which the power transmission device 10 is switched in the continuously variable state, and the range of the fifth gear is a speed shift control range (non-differential range) in which the power transmission device 10 is switched in the stepped ratio state. In short, the gearshift line chart of FIG. 7 also serves as a switching line chart for switching the power transmission device 10 between the continuously variable state and the stepped ratio state. The upshift lines and the downshift lines in the gearshift line chart of FIG. 7 are experimentally set such that the engine 8 and the power transmission device 10 operate optimally in the case where gasoline is used as the fuel for driving the engine 8, for example. In the case where a different type of fuel (for example, an ethanol-containing fuel obtained by mixing ethanol in a gasoline fuel at a certain ratio) from the fuel used to set the gearshift line chart (switching line chart) (for example, gasoline) is used, the upshift lines and the downshift lines may be modified in accordance with the fuel type. A case where the upshift lines and the downshift lines between the fourth speed and the fifth speed are modified will be discussed specifically later.

The driving power associated value is a parameter that makes one-to-one correspondence with the driving power for the vehicle, and may be not only the driving torque or the driving power at the driving wheels 38, but also the output torque $T_{OUT}$ of the automatic transmission part 20, the engine torque $T_E$, the vehicle acceleration, for example, an actual value of the engine torque $T_E$ calculated on the basis of the accelerator pedal operation amount or the throttle valve opening $\theta_{TH}$ (or intake air amount, air-fuel ratio, or fuel injection amount) and the engine speed $N_E$, for example, and estimated values of the required (target) engine torque $T_E$, the required (target) output torque $T_{OUT}$ of the automatic transmission part 20, or the like calculated on the basis of the amount of accelerator pedal operation performed by the driver, the throttle opening, or the like. The driving torque may be calculated from the output torque $T_{OUT}$ etc. in consideration of the differential ratio, the radius of the driving wheels 38, etc., or may be detected directly using a torque sensor or the like, for example. The other values such as torques mentioned above may be calculated in a similar way.

The upshift line from the fourth speed to the fifth speed and the downshift line from the fifth speed to the fourth speed in the gearshift line chart shown in FIG. 7, for example, are set so as to bring the power transmission device 10 into the stepped ratio state during high-speed travel in order not to bring the power transmission device 10 into the continuously variable state during high-speed travel, which deteriorates the fuel efficiency.

With this configuration, for example, although the power transmission device 10 is brought into the continuously variable state while the vehicle is traveling at low to mid speed to secure the fuel efficiency performance of the vehicle, the power transmission device 10 is brought into the stepped ratio state to operate as a speed shift transmission, allowing the output from the engine 8 to be transmitted to the driving wheels 38 through an exclusively mechanical power transmission path. This suppresses a conversion loss between kinetic power and electrical energy that occurs when the power transmission device 10 functions as an electrical continuously variable transmission, improving the fuel efficiency.

As described above, the differential part 11 (power transmission device 10) according to the embodiment can be selectively switched between the continuously variable state and the stepped ratio state (fixed ratio state). The switching control device 50 determines which state the differential part 11 should be switched to on the basis of the vehicle state, and selectively switches the differential part 11 into either of the continuously variable state and the stepped ratio state. In the embodiment, the hybrid control device 52 executes the motor travel or the engine travel on the basis of the vehicle state, and the engine start/stop control device 66 starts or stops the engine 8 to switch between the engine travel and the motor travel.

While the engine 8 basically uses gasoline as the fuel, an ethanol-containing fuel obtained by mixing ethanol in a gasoline fuel at a certain ratio is occasionally used as the fuel for driving the engine 8. In the embodiment, thus, the conditions for switching the power transmission device 10 into the continuously variable state or the stepped ratio state are modified in correspondence with the output characteristics of the engine 8, which are different in accordance with the type of the fuel (fuel type), for the purpose of reducing the fuel consumption rate etc. An essential part of the control function for modifying the switching conditions is described below.

Returning to FIG. 6, a fuel supply determination device 80 determines whether or not the fuel in a fuel tank 70 of the vehicle has increased. It is first determined whether or not the fuel has increased because although a fuel increase is not always the result of adding an ethanol-containing fuel to a gasoline fuel, the ethanol mixture ratio would not be modified and the output characteristics of the engine 8 would not change in accordance with the fuel type unless at least the fuel in the fuel tank 70 is increased. Specifically, it is determined whether or not the fuel in the fuel tank 70 has increased on the basis of a signal from a fuel gauge 72 that senses the amount of fuel in the fuel tank 70, for example. Alternatively, because the fuel filler cap 74 that closes the fuel filler for the fuel tank 70 is opened to supply fuel to the fuel tank 70, the fuel supply determination device 80 may sense opening/closing of the fuel filler cap 74 and determine that the fuel in the fuel tank 70 has increased in the case where the fuel filler cap 74 for the fuel tank 70 is opened.

The transmission member 18, the first electric motor M1, and the engine 8 are coupled to each other via the differential part planetary gear device 24. Therefore, in the case where the power transmission device 10 during the engine travel is in the continuously variable state, a reaction torque against the engine torque $T_E$ is output from the first electric motor M1 to rotate the transmission member 18 at a predetermined rotational speed. Thus, the engine torque $T_E$ can be obtained by obtaining the reaction torque. Thus, in the case where the fuel supply determination device 80 determines that the fuel in the fuel tank 70 has increased, an internal combustion engine output torque detection device 82 calculates an output torque $T_{M1}$ of the first electric motor M1 (hereinafter referred to as "first electric motor torque $T_{M1}$") as the reaction torque on the basis of the value of a current supplied to the first electric motor M1 obtained from the control amount supplied to the inverter 58, and detects the engine torque $T_E$ on the basis of the first electric motor torque $T_{M1}$, the gear ratio $\rho 0$, etc. Specifically, in the case where the engine torque $T_E$ and the first electric motor torque $T_{M1}$ are not 0 but match each other, that is, in the constant travel state, the engine torque $T_E$ can be calculated (detected) by the following equation (1). The negative sign on the right side of the equation (1) means that the first electric motor torque $T_{M1}$ is in the opposite direction to the engine torque $T_E$.

$$T_E = -T_{M1} \times (1+\rho 0)/\rho 0 \quad (1)$$

An internal combustion engine output torque determination device 84 determines, when the engine 8 is driven on a different type of fuel (for example, ethanol-containing fuel) from a reference fuel (for example, gasoline), which is prescribed as a fuel for driving the engine 8, whether or not the engine torque $T_E$ has become greater than the engine torque $T_E$ produced when the engine 8 is driven on the reference fuel. The determination is specifically made as described below.

A reference engine torque line chart indicating the relationship between the engine torque $T_E$ produced when the engine 8 is driven on the reference fuel (hereinafter referred to as "reference engine torque $T_{E\_std}$") and state amounts related to the engine output such as the engine speed $N_E$ and the throttle valve opening $\theta_{TH}$ has been empirically obtained, and stored in advance in the internal combustion engine output torque determination device 84. The internal combustion engine output torque detection device 82 then detects the engine torque $T_E$ on the basis of the first electric motor torque $T_{M1}$ etc., and thereafter the internal combustion engine output torque determination device 84 compares the engine torque $T_E$ detected by the internal combustion engine output torque detection device 82 (hereinafter referred to as "actual engine torque $TA_E$") and the reference engine torque $T_{E\_std}$ under the condition where the state amounts such as the engine speed $N_E$ and the throttle valve opening $\theta_{TH}$ are equal to determine whether or not the actual engine torque $TA_E$ is greater than the reference engine torque $T_{E\_std}$. At this time, it is desirable to consider that the engine torque $T_E$ may vary to some extent with respect to the reference engine torque $T_{E\_std}$, even if the fuel remains the reference fuel. Thus, the internal combustion engine output torque determination device 84 determines whether or not the actual engine torque $TA_E$ is greater than the reference engine torque $T_{E\_std}$ outside a predetermined variation range based on the reference engine torque $T_{E\_std}$. In this way, in the case where the internal combustion engine output torque determination device 84 determines that the actual engine torque $TA_E$ is greater than the reference engine torque $T_{E\_std}$, for example, it can be determined that the actual engine torque $TA_E$ is made greater than the reference engine torque $T_{E\_std}$ with the engine 8 driven on a different type of fuel from the reference fuel, because the actual engine torque $TA_E$ is detected when the fuel supply determination device 80 determines that the fuel in the fuel tank 70 has increased.

Figure 8:
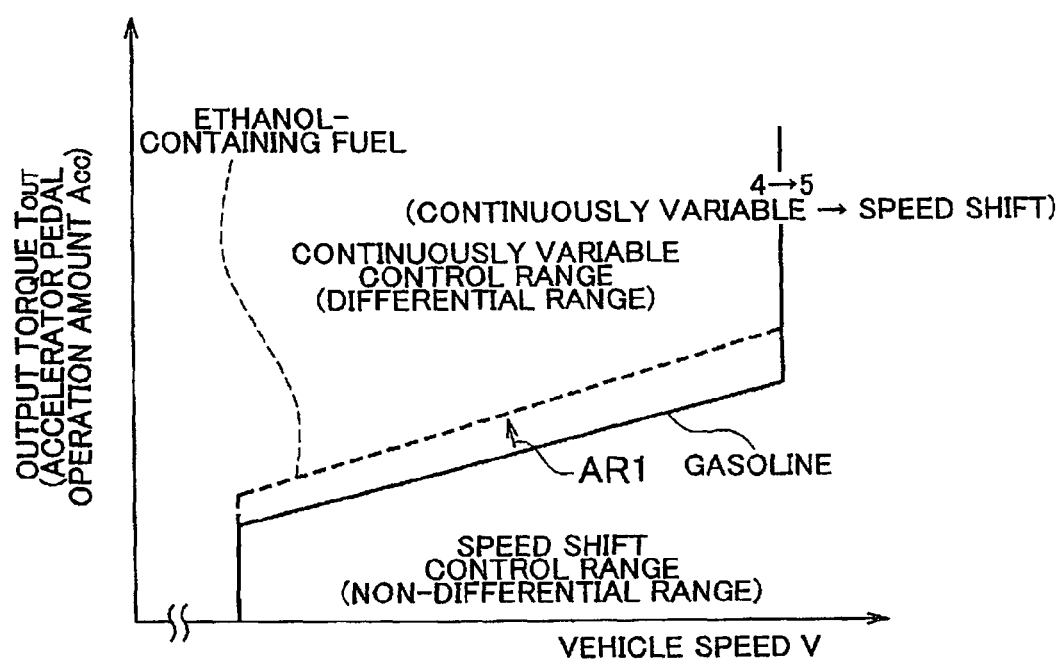
FIG. 8 shows a part of the upshift line from the fourth speed to the fifth speed of FIG. 7 as enlarged to illustrate how a differential state control device 88 of FIG. 6 expands a speed shift control range (non-differential range) of FIG. 7.

As shown in the gearshift line chart (switching line chart) of FIG. 7, the non-differential range for determining to bring the power distribution mechanism 16 into the non-differential state by engaging the changeover brake B0 (differential restriction device) is stored in advance in the storage device 56. For example, a gearshift line chart (switching line chart) for a case where the reference fuel (for example, gasoline) is used as the fuel for driving the engine 8 is stored as a reference. In the case where the engine 8 is driven on a different type of fuel (for example, ethanol-containing fuel) from the reference fuel (for example, gasoline) and the engine torque $T_E$ is thus greater than the engine torque $T_E$ produced when the engine 8 is driven on the reference fuel, that is, in the case where the internal combustion engine output torque determination device 84 determines that the actual engine torque $TA_E$ has become greater than the reference engine torque $T_{E\_std}$, the differential state control device 88 expands the non-differential range stored in the storage device 56 compared to that at the time when the engine 8 is driven on the reference fuel. Specifically, the differential state control device 88 expands the non-differential range by causing the whole or part of the upshift line to deviate from the fourth speed to the fifth speed and the downshift line from the fifth speed to the fourth speed of FIG. 7. A description is made using the upshift line from the fourth speed to the fifth speed of FIG. 7 as an example. As shown in FIG. 8, which shows a part of the upshift line from the fourth speed to the fifth speed as enlarged, the differential state control device 88 causes the upshift line of FIG. 8, which is the boundary line between the non-differential range and the differential range, to deviate from the solid line to the broken line as indicated by the arrow AR1 of FIG. 8 in the case where the internal combustion engine output torque determination device 84 makes a positive determination. The non-differential range is thus expanded compared to that at the time when the reference fuel is used (for example, when gasoline is used). In the case where the differential state control device 88 expands the non-differential state, the speed-increasing gear determination device 62 performs the determination and the switching control device 50 selectively switches the power distribution mechanism 16 between the differential enabled state and the non-differential state in accordance with the expanded non-differential range.

In expanding the non-differential range, the differential state control device 88 may determine in advance a non-differential range for a case where the internal combustion engine output torque determination device 84 makes a negative determination and an expanded non-differential range for a case where a positive determination is made, and may selectively switch between the non-differential ranges. However, the non-differential range may be expanded, either continuously or stepwise, as the engine torque $T_E$ is increased due to the difference in the fuel type, specifically as the engine torque $T_E$ detected by the internal combustion engine output torque detection device 82 is increased, without using the determination by the internal combustion engine output torque determination device 84, for example.

From the viewpoint of reducing the fuel consumption rate in the speed shift control range (non-differential range), while it is advantageous that the first electric motor M1 does not consume electricity, for example, it is disadvantageous that the engine 8 cannot be driven in accordance with the optimum fuel efficiency curve, for example. In the continuously variable control range (differential range), while it is advantageous that the engine 8 can be driven in accordance with the optimum fuel efficiency curve, the first electric motor M1 consumes electricity. The non-differential ranges before and after the expansion are determined to improve the fuel efficiency in total consideration of the above advantages and disadvantages, that is, the influence of the efficiency of the power transmission device 10 on the fuel efficiency and the influence of the efficiency of the engine 8 on the fuel efficiency.

In the case where the internal combustion engine output torque determination device 84 makes a negative determination, the differential state control device 88 does not modify the non-differential range for the reference fuel stored in the storage device 56, and the non-differential range for the reference fuel indicated in the gearshift line chart of FIG. 7 is used.

Figure 9:
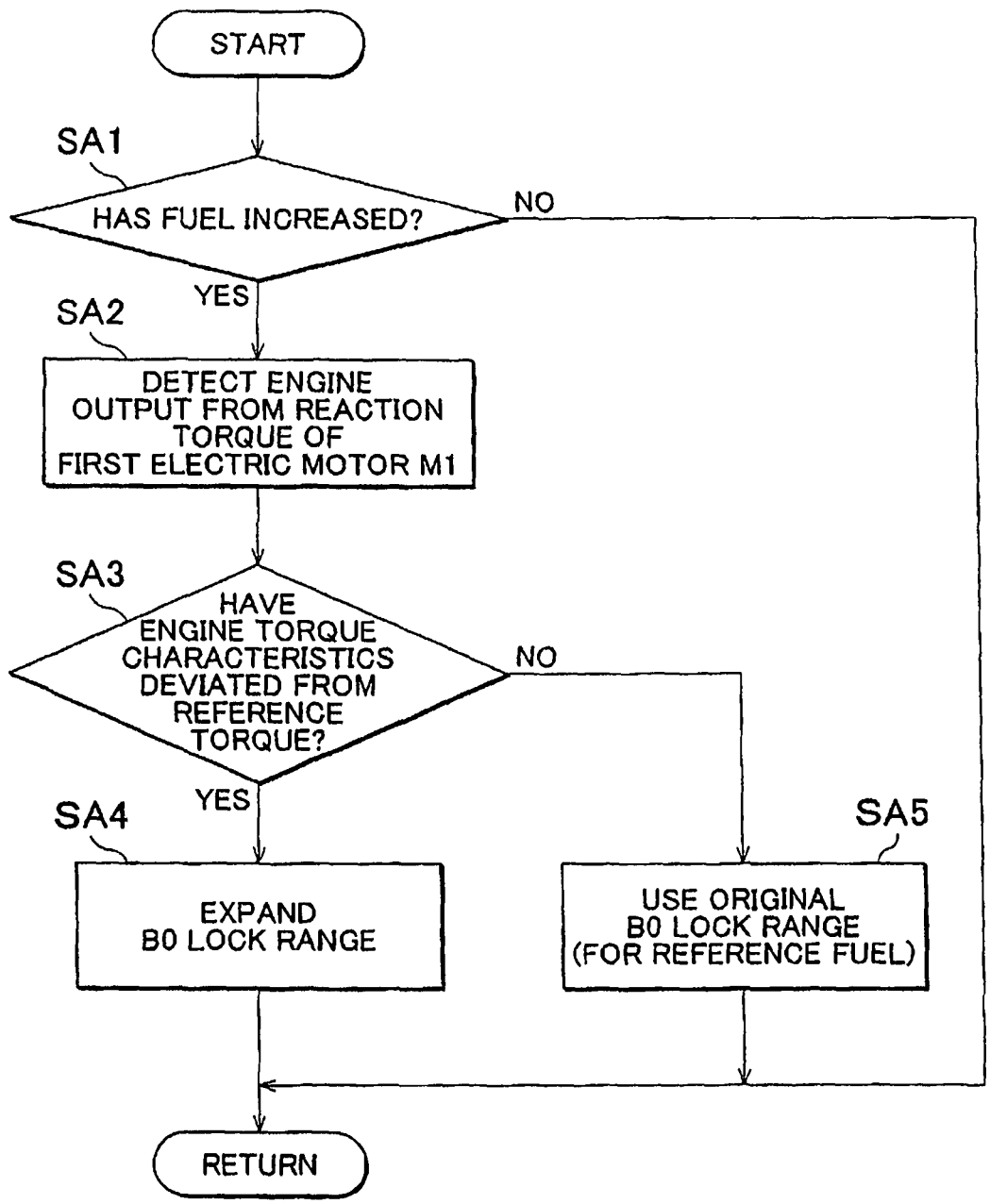
FIG. 9 is a flowchart that illustrates an essential part of a control process performed by the electronic control unit of FIG. 4, that is, a control process for modifying the non-differential range of FIG. 7 in accordance with the fuel type.

FIG. 9 is a flowchart illustrating an essential part of a control process performed by the electronic control unit 40, that is, a control process for modifying the non-differential range in accordance with the fuel type, which is executed repeatedly with an extremely short cycle time of about several msecs to several tens of msecs, for example.

First, in step (hereinafter the term "step" is omitted) SA1, which corresponds to the fuel supply determination device 80, it is determined whether or not the fuel in the fuel tank 70 of the vehicle has increased. If the determination is positive, the process proceeds to SA2. If the determination is negative, the control process of the flowchart is terminated. Specifically, it is determined whether or not the fuel in the fuel tank 70 has increased using a signal from the fuel gauge 72 that senses the amount of fuel in the fuel tank 70, for example. Since the fuel filler cap 74 for the fuel tank 70 is opened to supply fuel to the fuel tank 70, it is also possible to determine that the fuel in the fuel tank 70 has increased in the case where it is sensed that the fuel filler cap 74 is opened.

In SA2, which corresponds to the internal combustion engine output torque detection device 82, the first electric motor torque $T_{M1}$ as the reaction torque is detected on the basis of the value of a current supplied to the first electric motor M1 obtained from a control amount supplied to the inverter 58, and the engine torque $T_E$ (actual engine torque $TA_E$) is calculated on the basis of the first electric motor torque $T_{M1}$, the gear ratio $\rho 0$, etc. Specifically, in the case where the engine torque $T_E$ and the first electric motor torque $T_{M1}$ are not 0 but match each other, that is, in the constant travel state, the engine torque $T_E$ can be calculated by the above equation (1).

In SA3, which corresponds to the internal combustion engine output torque determination device 84, it is determined whether or not the engine 8 is driven on a different type of fuel (for example, ethanol-containing fuel) from the reference fuel (for example, gasoline) and the engine torque $T_E$ (actual engine torque $TA_E$) is thus greater than the engine torque $T_E$ (reference engine torque $T_{E\_std}$) produced when the engine 8 is driven on the reference fuel, specifically whether or not the actual engine torque $TA_E$ calculated in SA2 is greater than the reference engine torque $T_{E\_std}$. That is, it is determined whether or not the engine torque characteristics have deviated in the direction of increasing the engine torque $T_E$ relative to the engine torque characteristics provided when the reference fuel is used. At this time, the determination in SA3 is made in consideration of the fact that the engine torque $T_E$ may vary to some extent with respect to the reference engine torque $T_{E\_std}$, even if the fuel remains the reference fuel. If the determination in SA3 is positive, that is, if the actual engine torque $TA_E$ is greater than the reference engine torque $T_{E\_std}$, the process proceeds to SA4. If the determination in SA3 is negative, on the other hand, the process proceeds to SA5.

In SA4, which corresponds to the differential state control device 88, the non-differential range indicated in FIG. 7, that is, a B0 lock range in which the power distribution mechanism 16 is brought in the non-differential state by engaging the changeover brake B0, is expanded compared to the non-differential range (B0 lock range) for use when the engine 8 is driven on the reference fuel.

In SA5, which corresponds to the differential state control device 88, the non-differential range (B0 lock range) indicated in FIG. 7 is not expanded but remains the same as the non-differential range (B0 lock range) for use when the engine 8 is driven on the reference fuel.

Figure 10:
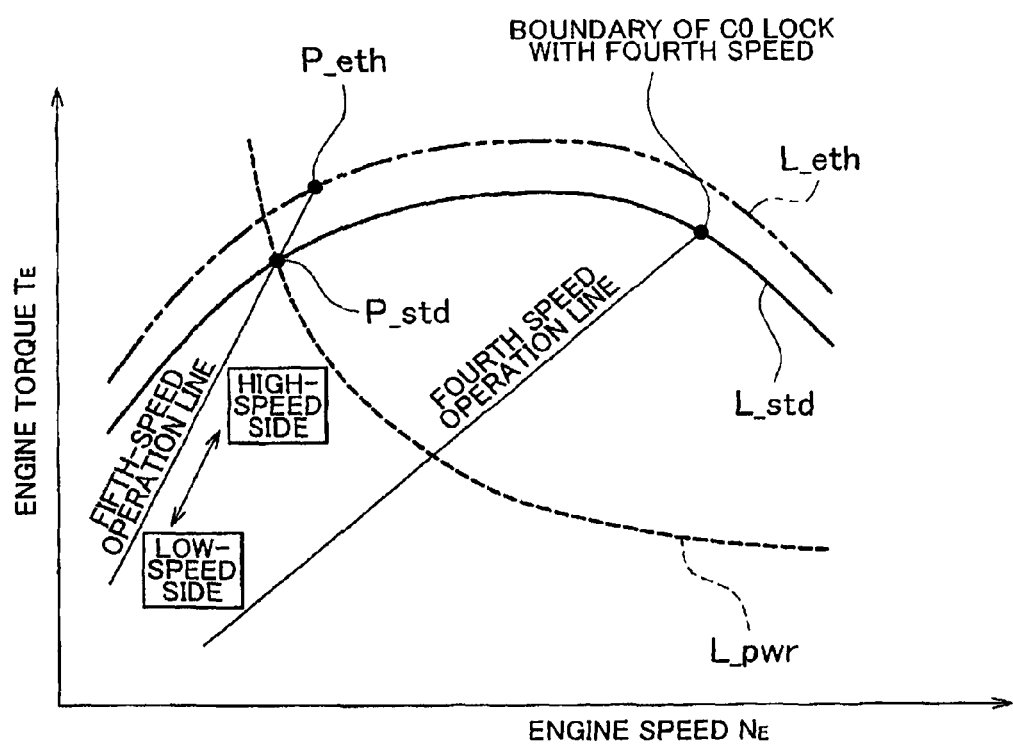
FIG. 10 shows engine torque characteristics to illustrate the influence of deviation of the engine torque characteristics, as the relationship between the engine speed and the engine torque, in the direction of increasing the engine torque in the case where the engine of FIG. 1 is driven on an ethanol-containing fuel obtained by mixing ethanol in gasoline, compared to the case where gasoline is used as the fuel.

The embodiment has the effects (A1) to (A7) below. (A1) FIG. 10 shows the engine torque characteristics as the relationship between the engine speed $N_E$ and the engine torque $T_E$. The curve L_std indicated by the solid line indicates the engine torque characteristics (throttle valve opening $\theta_{TH}$=100%) in the case where the engine 8 is driven on gasoline. The curve L_eth indicated by the double-dashed line indicates the engine torque characteristics (throttle valve opening $\theta_{TH}$=100%) in the case where the engine 8 is driven on the ethanol-containing fuel. A description is made of a case where the gear established in the power transmission device 10 is the fifth gear with reference to FIG. 10. The engine 8 is driven such that the engine operation point moves along the fifth-gear operation line in FIG. 10. In the case where the fuel for the engine 8 is gasoline, the point P_std at which the fifth-gear operation line intersects the curve L_std is the boundary on the high-speed side of the range in which the engine 8 is driven in the non-differential state with the changeover brake B0 locked and the engine operation point moving along the fifth-gear operation line. In the case where the fuel for the engine 8 is ethanol-containing fuel, however, the anti-knocking performance is improved and the engine ignition timing is advanced, which tends to increase the engine torque $T_E$ as a whole, compared to the case where the engine 8 is driven on gasoline. Therefore, when the fuel for the engine 8 is changed from gasoline to ethanol-containing fuel, the engine operation point indicating the boundary on the high-speed side of the range in which the engine 8 is driven in the non-differential state with the changeover brake B0 locked and the engine operation point moving along the fifth-gear operation line deviates from the point P_std to the point P_eth at which the fifth-gear operation line intersects the curve L_eth, enabling output of a higher engine torque $T_E$ on the fifth-gear operation line using the fifth speed. In other words, in the case where the fuel for the engine 8 is changed from gasoline to ethanol-containing fuel, it is possible to achieve a higher engine output than the engine output (in the unit of "kW", for example) indicated by the curve L_pwr, which indicates the same power and which passes through the point P_std, using the fifth gear, that is, in the non-differential state with the changeover brake B0 locked and the engine operation point moving along the fifth-gear operation line.

From the above, if the engine torque characteristics vary in accordance with the type of fuel for the engine 8, the non-differential range in which the changeover brake B0 is locked may be modified accordingly, which allows the engine torque characteristics to be fully utilized and contributes to reduction in the fuel consumption rate etc. In this respect, according to the embodiment, in the case where the engine 8 is driven on a different type of fuel (for example, ethanol-containing fuel) from the reference fuel (for example, gasoline) and the engine torque $T_E$ ($TA_E$) is thus greater than the engine torque $T_E$ ($T_{E\_std}$) produced when the engine 8 is driven on the reference fuel, that is, in the case where the internal combustion engine output torque determination device 84 determines that the actual engine torque $TA_E$ is greater than the reference engine torque $T_{E\_std}$, the differential state control device 88 expands the non-differential range stored in the storage device 56 compared to that at the time when the engine 8 is driven on the reference fuel. Thus, in the case where different types of fuel from the reference fuel, that is, a plurality of types of fuel, are supplied to the engine 8, the advantage of switching the power distribution mechanism 16 between the differential enabled state and the non-differential state can be fully utilized in correspondence with the engine torque characteristics, that is, the engine output characteristics, which may vary in accordance with the type of fuel for the engine 8. As a result, the fuel consumption rate can be reduced in correspondence with the plurality of types of fuel supplied to the engine 8, for example.

(A2) According to the embodiment, the internal combustion engine output torque detection device 82 calculates the first electric motor torque $T_{M1}$ as the reaction torque on the basis of the value of a current supplied to the first electric motor M1 obtained from a control amount supplied to the inverter 58, and detects the engine torque $T_E$ on the basis of the first electric motor torque $T_{M1}$, the gear ratio ρ0, etc. Therefore, the engine torque $T_E$ can be detected easily by calculating the first electric motor torque $T_{M1}$ from the value of a current supplied to the first electric motor M1 etc.

(A3) According to the embodiment, the internal combustion engine output torque detection device 82 detects the engine torque $T_E$ on the basis of the first electric motor torque $T_{M1}$, the gear ratio ρ0, etc., in the case where the fuel supply determination device 80 determines that the fuel in the fuel tank 70 has increased. Therefore, the engine torque $T_E$ is not always detected but detected as needed, reducing the load on the electronic control unit 40.

(A4) According to the embodiment, the fuel supply determination device 80 may sense opening/closing of the fuel filler cap 74 and determine that the fuel in the fuel tank 70 has increased in the case where the fuel filler cap 74 for the fuel tank 70 is opened. Further, the internal combustion engine output torque detection device 82 may detect the engine torque $T_E$ on the basis of the first electric motor torque $T_{M1}$, the gear ratio ρ0, etc., in the case where the fuel supply determination device 80 makes that determination. Therefore, the engine torque $T_E$ is not always detected but detected as needed, reducing the load on the electronic control unit 40. It is easier for the fuel supply determination device 80 to make that determination than to directly detect an increase of the fuel in the fuel tank 70.

(A5) According to the embodiment, the power transmission device 10 is provided with the automatic transmission part 20 in a part of the power transmission path from the engine 8 to the driving wheels 38. Therefore, the range of the total transmission ratio γT, within which the transmission ratio of the power transmission device 10 can be changed can be increased compared to the case where no automatic transmission part 20 is provided, obtaining excellent fuel efficiency performance.

(A6) According to the embodiment, the automatic transmission part 20 is a speed shift transmission part capable of changing its transmission ratio stepwise. Therefore, the range of the transmission ratio of the automatic transmission part 20 can be increased without significantly increasing the size of the automatic transmission part 20.

(A7) According to the embodiment, the differential part 11 functions as an electrical continuously variable transmission with its transmission ratio γ0 continuously variable between the minimum value γ0min and the maximum value γ0max when the differential part 11 is in the differential enabled state with both the changeover clutch C0 and the changeover brake B0 disengaged. Therefore, it is possible to smoothly vary the driving torque output from the differential part 11.

Although an embodiment of the present invention has been described in detail with reference to the drawings, the embodiment is merely illustrative, and the present invention may be modified and improved in various ways on the basis of the knowledge of those skilled in the art.

For example, while the non-differential range of the power distribution mechanism 16 corresponds to the fifth gear in the above embodiment, the non-differential range may not necessarily correspond to any gear of the power transmission device 10.

While the power distribution mechanism 16 includes the changeover brake B0 and the changeover clutch C0 in order to establish the non-differential state in the above embodiment, the changeover clutch C0 may not necessarily be provided.

In the case where the point indicating the relationship between the vehicle speed V and the required output torque $T_{OUT}$ is in the non-differential range (speed shift control range) in FIG. 7, the power distribution mechanism 16 increases the engine speed $N_E$ with the changeover brake B0 engaged in the above embodiment. However, the engine speed $N_E$ may not necessarily be increased when the power distribution mechanism 16 is in the non-differential state.

While the changeover brake B0 corresponds to the differential restriction device according to the present invention in the above embodiment, the differential restriction device is not limited to an engagement device such as a brake or a clutch. For example, the first electric motor M1 may be made unable to rotate electrically so that the first electric motor M1 corresponds to the differential restriction device, rather than to engage the changeover brake B0.

While the non-differential range is defined by the relationship between the vehicle speed V and the required output torque $T_{OUT}$ of the automatic transmission part 20 as shown in FIG. 7 in the above embodiment, the non-differential range may be defined by the relationship between other state amounts such as the engine speed $N_E$, the engine torque $T_E$, and the throttle valve opening $θ_{TH}$, for example.

While the engine torque $T_E$ is detected on the basis of the first electric motor torque $T_{M1}$ in the above embodiment, the engine torque $T_E$ may be detected otherwise.

While the power transmission device 10 is a part of a hybrid vehicle in the above embodiment, the present invention is not limited to application to such a gear train as shown in FIG. 1, and may be applied to vehicles other than hybrid vehicles.

While gasoline and the ethanol-containing fuel are selectively supplied to the engine 8, that is, the fuels supplied to the engine 8 are based on the same component, namely gasoline, in the above embodiment, the fuels supplied to the engine 8 may not necessarily be based on the same main component.

While ethanol is mixed with the gasoline fuel to be supplied to the engine 8 in the above embodiment, the fuel to be supplied to the engine 8 may be light oil, hydrogen, or ethanol itself, or a composite fuel containing one of them as the main component, for example. The fuel to be added is not limited to ethanol.

While the power transmission device 10 includes the second electric motor M2 in the above embodiment, the power transmission device 10 may not necessarily include the second electric motor M2.

While the automatic transmission part 20 is provided in the power transmission path between the differential part 11 and the driving wheels 38 in the above embodiment, the power transmission device 10 may not necessarily include the automatic transmission part 20.

The order of SA1 and SA2 may be reversed in the flowchart of the above embodiment shown in FIG. 9.

In the flowchart shown in FIG. 9 according to the above embodiment, SA2 and the subsequent steps are executed in the case where a positive determination is made in SA1. However, a flowchart without SA1, that is, a flowchart in which SA2 and the subsequent steps are executed irrespective of the determination result of SA1, is also possible.

While the differential part 11 (power distribution mechanism 16) functions as an electrical continuously variable transmission with its transmission ratio $\gamma 0$ continuously variable between the minimum value $\gamma 0min$ and the maximum value $\gamma 0max$ by controlling the operating state of the first electric motor M1 in the above embodiment, the transmission ratio $\gamma 0$ of the differential part 11 may be varied stepwise utilizing the differential action rather than continuously, for example.

While the engine 8 and the differential part 11 are directly coupled to each other in the power transmission device 10 according to the above embodiment, the engine 8 may be coupled to the differential part 11 via an engagement element such as a clutch.

While the first electric motor M1 and the second rotary element RE2 are directly coupled to each other and the second electric motor M2 and the third rotary element RE3 are directly coupled to each other in the power transmission device 10 according to the above embodiment, the first electric motor M1 may be coupled to the second rotary element RE2 via an engagement element such as a clutch and the second electric motor M2 may be coupled to the third rotary element RE3 via an engagement element such as a clutch.

While the differential part 11 is followed by the automatic transmission part 20 in the power transmission path from the engine 8 to the driving wheels 38 in the above embodiment, the differential part 11 may be preceded by the automatic transmission part 20. In short, the automatic transmission part 20 may be provided to constitute a part of the power transmission path from the engine 8 to the driving wheels 38.

In the above embodiment, as shown in FIG. 1, the differential part 11 and the automatic transmission part 20 are directly coupled to each other. However, the present invention is also applicable to the case where the differential part 11 and the automatic transmission part 20 are not mechanically independent of each other if the power transmission device 10 as a whole has an electrical differential function for electrically changing the differential state and a function for changing the transmission ratio on the basis of a different principle from speed change using the electrical differential function.

While the power distribution mechanism 16 is a single planetary type in the above embodiment, the power distribution mechanism 16 may also be a double planetary type.

In the above embodiment, the engine 8 is coupled to the first rotary element RE1 constituting the differential part planetary gear device 24 for power transmission, the first electric motor M1 is coupled to the second rotary element RE2 for power transmission, and the power transmission path to the driving wheels 38 is coupled to the third rotary element RE3. However, the present invention is also applicable to a configuration in which two planetary gear devices are coupled to each other through rotary elements constituting the planetary gear devices, an engine, an electric motor, and driving wheels are coupled to the respective rotary elements of the planetary gear devices, and switching between speed shift operation and continuously variable operation can be performed by controlling a clutch or a brake coupled to the rotary elements of the planetary gear devices.

While the automatic transmission part 20 functions as an automatic speed shift transmission in the above embodiment, the automatic transmission part 20 may also function as a continuously variable transmission (CVT) or a manual transmission.

The changeover clutch C0 and the changeover brake B0, which are each a hydraulic friction engagement device in the above embodiment, may each be a magnetic-particle, electromagnetic, or mechanical engagement device such as a powder (magnetic-particle) clutch, an electromagnetic clutch, or a meshing dog clutch.

While the second electric motor M2 is directly coupled to the transmission member 18 in the above embodiment, the second electric motor M2 may not necessarily be coupled in that way, and may be coupled to the power transmission path from the engine 8 or the transmission member 18 to the driving wheels 38 directly or indirectly via a transmission, a planetary gear device, an engagement device, or the like.

While the differential part carrier CA0 is coupled to the engine 8, the differential part sun gear S0 is coupled to the first electric motor M1, and the differential part ring gear R0 is coupled to the transmission member 18 in the power distribution mechanism 16 according to the above embodiment, their coupling relationship is not necessarily limited thereto, and the engine 8, the first electric motor M1, and the transmission member 18 may be coupled to any of the three elements CA0, S0, R0 of the differential part planetary gear device 24.

While the engine 8 is directly coupled to the input shaft 14 in the above embodiment, they may be operably coupled to each other via a gear or a belt, for example, and may not necessarily be arranged on a common axis.

In the above embodiment, the first electric motor M1 and the second electric motor M2 are arranged coaxially with the input shaft 14, and coupled to the differential part sun gear S0 and the transmission member 18, respectively. However, the first electric motor M1 and the second electric motor M2 may not necessarily be arranged in that way, and the first electric motor M1 and the second electric motor M2 may be operably coupled to the differential part sun gear S0 and the transmission member 18 via a gear, a belt, or a speed reducer, for example.

While the automatic transmission part 20 is coupled in series with the differential part 11 via the transmission member 18 in the above embodiment, a counter shaft may be provided in parallel to the input shaft 14 and the automatic transmission part 20 may be arranged coaxially on the counter shaft. In this case, the differential part 11 and the automatic transmission part 20 are coupled for power transmission via a set of transmission members constituted by a counter gear pair, a sprocket, and a chain as the transmission member 18, for example.

While the power distribution mechanism 16 is constituted by a set of the differential part planetary gear device 24 in the above embodiment, the power distribution mechanism 16 may be constituted by two or more planetary gear devices to function as a transmission with three or more speeds in the non-differential state (fixed ratio state).

While the second electric motor M2 is coupled to the transmission member 18 constituting a part of the power transmission path from the engine 8 to the driving wheels 38 in the above embodiment, the power transmission device 10 may be configured such that the differential state of the power distribution mechanism 16 can be controlled by the second electric motor M2 in place of the first electric motor M1 with the second electric motor M2 coupled to the power transmission path and additionally coupled to the power distribution mechanism 16 via an engagement element such as a clutch.

While the power distribution mechanism 16 includes the changeover clutch C0 and the changeover brake B0 in the above embodiment, the power transmission device 10 may also include a changeover clutch C0 and a changeover brake B0 separately from the power distribution mechanism 16.

While the differential part 11 includes the first electric motor M1 and the second electric motor M2 in the above embodiment, the power transmission device 10 may also include a first electric motor M1 and a second electric motor M2 separately from the differential part 11.

Although not illustrated specifically, the present invention may be modified in various ways without departing from the scope and spirit of the present invention.

The invention claimed is:

1. A control device for a power transmission device for a vehicle comprising:
   an electrical differential part that has a differential mechanism that is coupled between an internal combustion engine and a driving wheel and an electric motor that is coupled to the differential mechanism for power transmission, the electrical differential part controlling a differential state of the differential mechanism by controlling an operating state of the electric motor;
   a differential restriction device that is capable of selectively switching the differential mechanism between a non-differential state in which a differential action of the differential mechanism is disabled and a differential enabled state in which the differential action of the differential mechanism is enabled; and
   a differential state control device that, in the case where the internal combustion engine is driven on a different type of fuel from a reference fuel prescribed as a fuel for driving the internal combustion engine and an output torque of the internal combustion engine is thus greater than the output torque of the internal combustion engine produced when the internal combustion engine is driven on the reference fuel, expands a non-differential range, on the basis of which the differential restriction device determines to switch the differential mechanism into the non-differential state, compared to the non-differential range for use when the internal combustion engine is driven on the reference fuel,
   wherein in expanding the non-differential range, a switching boundary line is deviated to an increased output torque.

2. The control device for a power transmission device for a vehicle according to claim 1, wherein a second electric motor is coupled to a power transmission shaft, which transmits an output of the differential mechanism, to apply torque to the power transmission shaft.

3. The control device for a power transmission device for a vehicle according to claim 1, wherein the differential state control device expands the non-differential range as the output torque of the internal combustion engine becomes greater due to a difference in the type of fuel.

4. The control device for a power transmission device for a vehicle according to claim 1, wherein the output torque of the internal combustion engine is detected on the basis of a reaction torque of the electric motor against the output torque of the internal combustion engine.

5. The control device for a power transmission device for a vehicle according to claim 1, wherein the output torque of the internal combustion engine is detected in the case where an amount of fuel in a fuel tank of the vehicle has increased.

6. The control device for a power transmission device for a vehicle according to claim 1, wherein the output torque of the internal combustion engine is detected in the case where a cap that closes a fuel filler for the fuel tank of the vehicle has been opened.

7. The control device for a power transmission device for a vehicle according to claim 1, wherein an automatic transmission part is provided in a part of a power transmission path from the internal combustion engine to the driving wheel.

8. The control device for a power transmission device for a vehicle according to claim 7, wherein the automatic transmission part is a speed shift transmission part that is capable of changing its transmission ratio stepwise.

9. The control device for a power transmission device for a vehicle according to claim 1, wherein the electrical differential part functions as a continuously variable transmission that is capable of continuously varying its transmission ratio in the differential enabled state.

10. The control device for a power transmission device for a vehicle according to claim 1, wherein the differential restriction device as a differential state switching device switches the differential mechanism to the non-differential state, using an engagement of a mechanical coupling device, by disenabling the rotation of a certain rotary element among a plurality of rotary elements or causing the whole of the plurality of rotary elements to movie in unitary rotation.

* * * * *